(12) United States Patent
Gwiazda et al.

(10) Patent No.: US 7,877,327 B2
(45) Date of Patent: Jan. 25, 2011

(54) APPARATUS AND METHOD FOR CREATING AND USING DOCUMENTS IN A DISTRIBUTED COMPUTING NETWORK

(75) Inventors: Ronald E. Gwiazda, West Roxbury, MA (US); Spencer S. Sanchez, Weymouth, MA (US); Jonah Goldstein, Brighton, MA (US)

(73) Assignee: Trintuition LLC, West Roxbury, MA (US)

( * ) Notice: Subject to any disclaimer, the term of this patent is extended or adjusted under 35 U.S.C. 154(b) by 1076 days.

(21) Appl. No.: 11/120,928

(22) Filed: May 3, 2005

(65) Prior Publication Data

US 2005/0246283 A1 Nov. 3, 2005

Related U.S. Application Data

(60) Provisional application No. 60/567,491, filed on May 3, 2004.

(51) Int. Cl.
G06F 21/00 (2006.01)
G06F 9/44 (2006.01)
(52) U.S. Cl. .......................... 705/52; 717/105; 717/113
(58) Field of Classification Search .................. None
See application file for complete search history.

(56) References Cited

U.S. PATENT DOCUMENTS

| | | | |
|---|---|---|---|
| 5,592,602 | A | 1/1997 | Edmunds et al. |
| 5,845,299 | A | 12/1998 | Arora et al. |
| 5,907,704 | A * | 5/1999 | Gudmundson et al. ...... 717/100 |
| 5,911,145 | A | 6/1999 | Arora et al. |
| 6,105,027 | A * | 8/2000 | Schneider et al. ................... 1/1 |
| 6,269,406 | B1 | 7/2001 | Dutcher et al. |
| 6,385,655 | B1 | 5/2002 | Smith et al. |
| 6,393,469 | B1 * | 5/2002 | Dozier et al. ................ 709/219 |
| 6,513,111 | B2 | 1/2003 | Klimczak et al. |
| 6,546,397 | B1 | 4/2003 | Rempell |
| 6,597,358 | B2 | 7/2003 | Miller |
| 6,606,105 | B1 | 8/2003 | Quartetti |
| 6,643,663 | B1 * | 11/2003 | Dabney et al. ............... 707/102 |
| 6,684,369 | B1 * | 1/2004 | Bernardo et al. ............. 715/205 |
| 7,275,079 | B2 * | 9/2007 | Brodsky et al. .............. 709/203 |

(Continued)

OTHER PUBLICATIONS

International Search Report in PCT/US05/15220 dated May 22, 2007.

(Continued)

*Primary Examiner*—Andrew J. Fischer
*Assistant Examiner*—C. Aaron McIntyre
(74) *Attorney, Agent, or Firm*—J. Scott Southworth

(57) ABSTRACT

An authoring application for allowing users to create, control and distribute electronic content including a canvas interface for constructing a project of the electronic content from a plurality of resource files, the canvas interface having: a canvas area for constructing screen elements of the selected resource files to create screens; a path area for illustrating a relationship among the screens of the project; and a properties area for adjusting characteristics of the selected screen elements, a reader interface for allowing the users to view the project, the reader interface being accessible from the canvas interface and a resource interface for managing groups, membership in groups, and user accounts, said groups and user accounts having varying levels of control over the project.

6 Claims, 14 Drawing Sheets

U.S. PATENT DOCUMENTS

| | | | |
|---|---|---|---|
| 7,367,048 B2* | 4/2008 | Kelley et al. | 726/2 |
| 2002/0077842 A1* | 6/2002 | Charisius et al. | 705/1 |
| 2002/0138582 A1* | 9/2002 | Chandra et al. | 709/206 |
| 2002/0161603 A1* | 10/2002 | Gonzales | 705/1 |
| 2002/0194195 A1* | 12/2002 | Fenton et al. | 707/104.1 |
| 2003/0195932 A1* | 10/2003 | Tanabe et al. | 709/205 |
| 2004/0198308 A1 | 10/2004 | Hurst et al. | |
| 2004/0267871 A1* | 12/2004 | Pratley et al. | 709/200 |

OTHER PUBLICATIONS

Written Opinion of the International Searching Authority in PCT/US05/15220 dated May 22, 2007.

\* cited by examiner

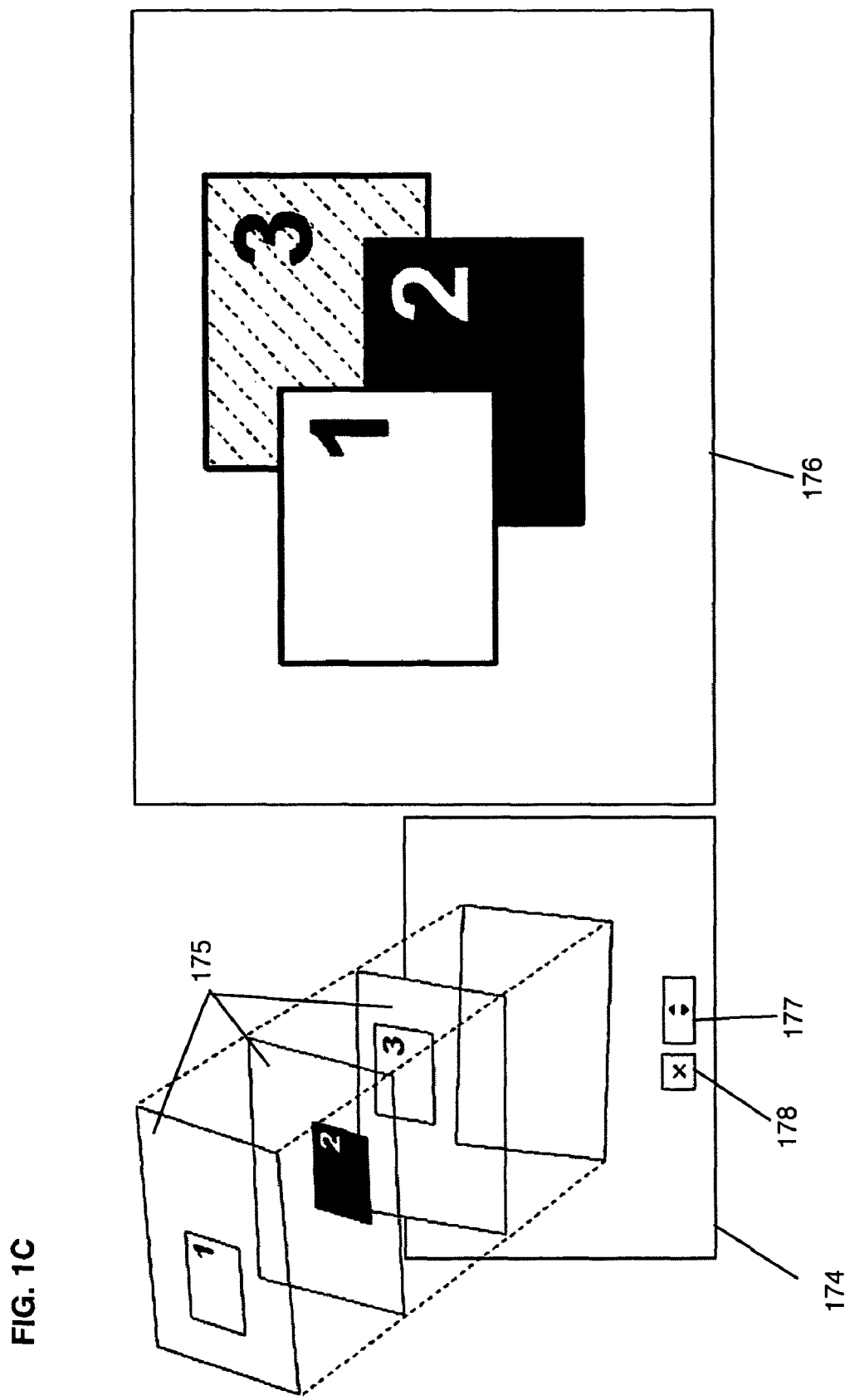

FIG. 2C

- 262 — Prof. John Straddle
- 264 — Physics AP
- 266 —
  Last name:
  First name:
  username:
  password:
  email:
  address:
  phone:
- 268 — Submit
- 260

| Group Membership List ||
|---|---|
| Group Member's User Information | Group Permissions |
| Smith, James, fledermouse, b7Z504, jsmith@hotmail.com, 43 Beeker St, New Britain, CT 06052, 203-555-4343 | Share ✓ |
| Brownski, Elliot, elliot72, glucklich, firestone@elf.com 144 Mt. Vernon St. New York, NY 10012 212-878-9999 | ✓ |
|  | ✓ |
|  | ✓ |
|  | ✓ |

272 — Submit   274

APPARATUS AND METHOD FOR CREATING AND USING DOCUMENTS IN A DISTRIBUTED COMPUTING NETWORK

CROSS-REFERENCE TO RELATED APPLICATION

This application claims priority to U.S. Provisional Patent Application No. 60/567,491, filed May 3, 2004, which is incorporated herein by reference.

BACKGROUND OF THE INVENTION

1. Field of the Invention

The subject disclosure relates to systems and methods for creating, maintaining and distributing electronic documents in a distributed computing network.

2. Background of the Related Art

Historically, authoring and modifying websites has been an expensive and labor intensive task that required significant technical knowledge. With that knowledge, it was not difficult to modify a screen element in a website, for example to edit or replace text or switch one image with another. However, any architectural changes to a web screen, such as changing the design of its table or frames, or adding new multimedia components such as video or audio, required significant effort. As a result, most websites remained essentially unchanged for months or even years after creation.

The nature of web authoring helped define the world wide web as historically encyclopedic in nature, a massive compendium of virtual information that, placed online, was far more static than dynamic. While an email connotes a very transient and short-lived piece of information, a website suggests information that is much more monolithic and unchanging.

Many web authoring applications and tools have been developed to make web authoring easier and more accessible to the technically unsophisticated. Some web hosts advertise that anyone can create a website in minutes, using their online tools. This web authoring simplicity is achieved through the use of prefigured templates that are the electronic equivalent of painting by numbers and limit the web author's options.

The challenge is to break the dichotomy that web authors must either: master a demanding technological learning curve and work in HTML code or through complex and time-consuming applications that generate such code; or create basic and constricted websites that have already been partially designed and constructed for them.

SUMMARY OF THE INVENTION

There is a need for non-technical web users to move beyond the limitations of online templates, to construct original complex, multimedia web screens, and to hyperlink those screens in whatever pattern the users choose without technical knowledge. Beyond simply giving greater creative power to non-technical web authors, this need relates to shifting use of the web and the emergence of different user expectations for that experience. Rather than going online to find information, web users are increasingly seeking to join virtual communities of common interest and to function as contributors, not simply consumers of prepackaged information. Weblogs and discussion boards allow participants who are not technologically savvy to contribute and to evoke responses from select digital communities. Collaborative websites, called wiki websites, allow a collection of authors to add, modify, and delete content that is in a constant state of flux and evolution. There are websites whose sole purpose is to show the relationships and interconnections between account holders, or to foster such interconnections.

The web is moving toward a democratization of who has voice and a presence online. The nature of web authorship is changing. Web authorship is not simply focused on the creation of comparatively static websites, but increasingly on creating and sharing sophisticated, multimedia information within a virtual community. That information may take the form and structure of a website, in that it contains disparate screen elements arranged in hyperlinked web screens. However, it is not intended to stand indefinitely alone but rather to be transient, shared, revised, responded to, and discarded as part of a multimedia conversation within a digital community.

Consequently there is a need to make it possible for non-technical web authors to collect and manage resource files for constructing web screens without having to use file transfer protocol or image manipulation applications, and to construct and hyperlink completely original multimedia web screens without technical knowledge. There is a need to make it possible to publish such documents immediately with individual web addresses and just as easily and readily remove them from online view. Consequently, web authors need to be able to generate an unlimited number of individual web addresses to publish whatever documents they choose, possibly using different web addresses as different entry points for different audiences. In addition to putting documents online with individual web address, there is a need to transfer documents within a defined digital community of account holders that are not accessible to the general public through a web addresses but internally transferred within the community. The creating and sharing of documents back and forth among virtual community members may suffice for some definitions of digital community, but others will require the more immediate responses and communication afforded by discussion threads. Rather than having a discussion thread be an isolated, separate entity from the web documents that are created and shared to spawn the discussion, non-technical web authors should be able to insert a discussion into any web screen as easily as dragging in an image, so that a discussion thread exists along with the multimedia prompt or prompts that are meant to evoke the discussion.

There is also a need for non-technical web authors to be able to create and manage, not simply to join, online communities and to be able to share both resources and hyperlinked web screens with community members, as well as to present any hyperlinked web screens online with independent web addresses, or URLs, for a more expansive audience of potential community members. It is an object of the subject technology to make the creation and management of such communities accessible to non-technical users. Such fostering of digital communities, developing user accounts and diverse communal groupings, may include a hierarchy of users and differentiated sets of permissions for different community members.

There is a need to respond to the changes taking place in the nature of web authorship, as the web becomes increasingly a collection of digital communities of sharers, problem solvers, teachers and learners, planners, advocates, and activists—all contributors as opposed to passive visitors. Such digital communities may evolve as the counterpart to existing communities of common interest: teachers, professors, and their classes, business planning teams, artists' cooperatives, political action groups, and the like. The communities may also evolve entirely online and have no real-world counterpart. Critical to their existence is the fluid and facile creation and sharing of digital information.

It is an object of the subject technology to allow transformation of design and content across generations of users through manipulating copies or clones. In different guises, the authoring application both writes and reads projects. The initial authors of projects can share their projects with other account holders and specify if the projects are shared with a read-only permission, which means the projects can only be opened and viewed in the reader mode and not modified, or the projects can be shared with permission to modify, which means that the projects can be opened in the application's authoring and editing component. With permission to modify, users with whom the projects are shared may modify the projects in any way, but not, however, save over the original, rather users save their own versions. This first revision, renaming, and saving of projects is essentially one generation of change. The user who creates this second version of a project can likewise share the second version further with or without the permission to modify his version with another user, a second generation of modifications, and so forth through an indefinite succession of generations of change.

It is an object of the subject technology to allow transformation of design and content across generations of users. In different guises, the authoring application both writes and reads projects. The initial authors of projectscan publish their projects in a form as static and unalterable as most HTML screens, however, they may have the option of establishing a degree of dynamism for subsequent viewers. In a preferred embodiment, authors of projects can pass on to users anywhere from 0% to 100% on a sliding scale of the capability to change project design and content.

It is an object of the subject technology to allow the original authors of projects to lock or leave unlocked individual screen elements (or groups of elements) in any given screen that they create, or to lock or leave unlocked entire screens or collections of screens.

It is another object of the subject technology to allow project authors to copy and modify the original project to some pre-established degree without changing the original, either for local use or for broader distribution. The option exists as well for the next generation of users to lock additional elements that were left unlocked for them or that they have added to the project and subsequently to pass on these redefined privileges and limitations to a following generation of users. The establishing and passing on of such privileges and the controlled evolution of projects could move through any number of generations of users.

In this initial description of the transformation of projects across generations of users, the project in each subsequent generation carries a previously established set of permissions with some elements locked and some modifiable; however, the spawned project exists independently as a complete copy of content and design from the previous generation. If the previous version of the project, from which the next generation was copied, is modified or deleted, the copy continues to exist independently. The dependence across generations does not exist beyond the inherited set of permissions.

In a different embodiment of the transformation of projects across generations of users, subsequent projects might not be separate and independent copies but rather modified references back to the original parent project. Users could make changes and additions to the original project and save those changes as their own version without changing the original parent files. However, they would not produce a separate, independent copy of the original. One consequence of this use of references is that changing a locked element in the parent project could cascades that change down through the succession of offspring projects. Each generation would have the power to trigger such a cascading change for elements that it locked. The generations of users who evolved a project could be empowered to view a list of all of the references associated with the project and track its evolution. In one example of the transformation across generations of users, a publishing company creates a digital $7^{th}$ grade math curriculum, which it sells to the central office of a school district. The company locks a limited amount of information about the origin and authors of the curriculum. The central office administrators add additional examples and content based on the needs of their particular teachers and students. They move material out of the curriculum that they do not cover in the $7^{th}$ grade and place it in the digital curricula of other grades. As the first generation of change, the central office administrators lock certain elements deemed pedagogically crucial. They add materials based on their in-service initiatives. The electronic curriculum is then passed on to teachers. Teachers have a degree of flexibility in terms of changing examples, adding links to personal materials and resources. The teachers then might lock most additional elements and pass the curriculum on to students, the third generation of users, granting students the ability to answer questions in the material, link to their own notes or other relevant materials that they have found, and/or possibly to use a reader-based highlighting tool to mark up and annotate their readings in their copies or references of the digital text. All these non-technical users need to be working in the same accessible authoring application. Given that capability, it is possible for any preceding generation of users to review changes taking place further along the progression of transformations. The option may exist to cascade changes in locked elements and screens down through the generations of users.

In another embodiment of the transformation of projects across generations of users, all allowable changes are limited to the parent project itself. Part of that project is locked and unalterable. As users change the alterable section, the change is directly to the original document. No record is kept of the generations of changes. This embodiment is similar to but more powerful than a wiki website, where multiple authors constantly change content within the constraints of templates. What would be modified is not simply text entries but intricate, multimedia hyperlinked screens. Such an environment for the evolution of information would spark complex debate about what should be locked and unalterable and what remains in the hands of subsequent generations of users.

It is possible to combine features from each of these different embodiments of the transformation of projects across generations of users in additional embodiments. They are all designed to promote the rich exchange and evolution of information in digital communities.

It is an object of the subject technology to foster community. In its simplest version, community grows from empowering a broader segment of people to have an authoring presence without technical knowledge or the impediment of a steep software learning curve.

It is an object of the subject technology to provide an authoring application that has the ability to group, or link, any of the elements in a given screen, or throughout a project, so that the group can be moved, have some property such as color changed, copied, pasted or otherwise modified as a single entity is preferred. It is likewise an object of the subject technology to provide an authoring application that has the ability to group, or link, any of the screens, or attachments within a project, so that the group can be moved, copied and pasted, or otherwise modified as a single entity is preferred. It is still another object of the subject technology to provide an authoring application that is small enough to reside on clients with storage constraints such as cell phones.

One aspect of the subject technology is directed to an authoring application for allowing users to create, control and distribute electronic content including a canvas interface for constructing the electronic content from a plurality of documents, the canvas interface having: a canvas area for viewing a selected document; a path area for creating, modifying, and illustrating the hyperlinks among screens and attachments within a document; and a properties area for adjusting characteristics of the selected document, a reader interface for allowing the users to view the electronic content, the reader interface being accessible from the canvas interface and a resource interface for sharing documents internally within a digital community without publishing them with a web address and for creating and managing groups and membership in the groups, said groups and members having varying permissions and levels of control over the electronic content.

One aspect of the subject technology is directed to a method for creating and using documents for distribution in an academic network, the method including the steps of constructing a plurality of projects in a canvas interface, the projects having a plurality of electronic pages each composed of multimedia elements selected from a resource interface, setting aesthetic properties for the plurality of web screens in a properties area linking any desired electronic page within a project to another electronic page or resource file by using a path area. In an Internet application, web screens do not have to be linked to at least one other screen, i.e., a project could be a single screen. Further, all projects are not assigned monikers.

BRIEF DESCRIPTION OF THE DRAWINGS

So that those having ordinary skill in the art to which the disclosed system appertains will more readily understand how to make and use the same, reference may be had to the following drawings.

FIG. 1C is an exemplary screen of a two-part layers tool that changes the Z-depth of screen elements in accordance with the subject disclosure.

FIG. 2C is a somewhat schematic diagram illustrating a members application screen, the tool for applying for group membership in accordance with the subject disclosure.

FIG. 2D is a somewhat schematic diagram illustrating a members list, the tool for approving new user accounts and group membership and for managing groups in accordance with the subject disclosure.

DESCRIPTION OF THE PREFERRED EMBODIMENTS

Figure 1:
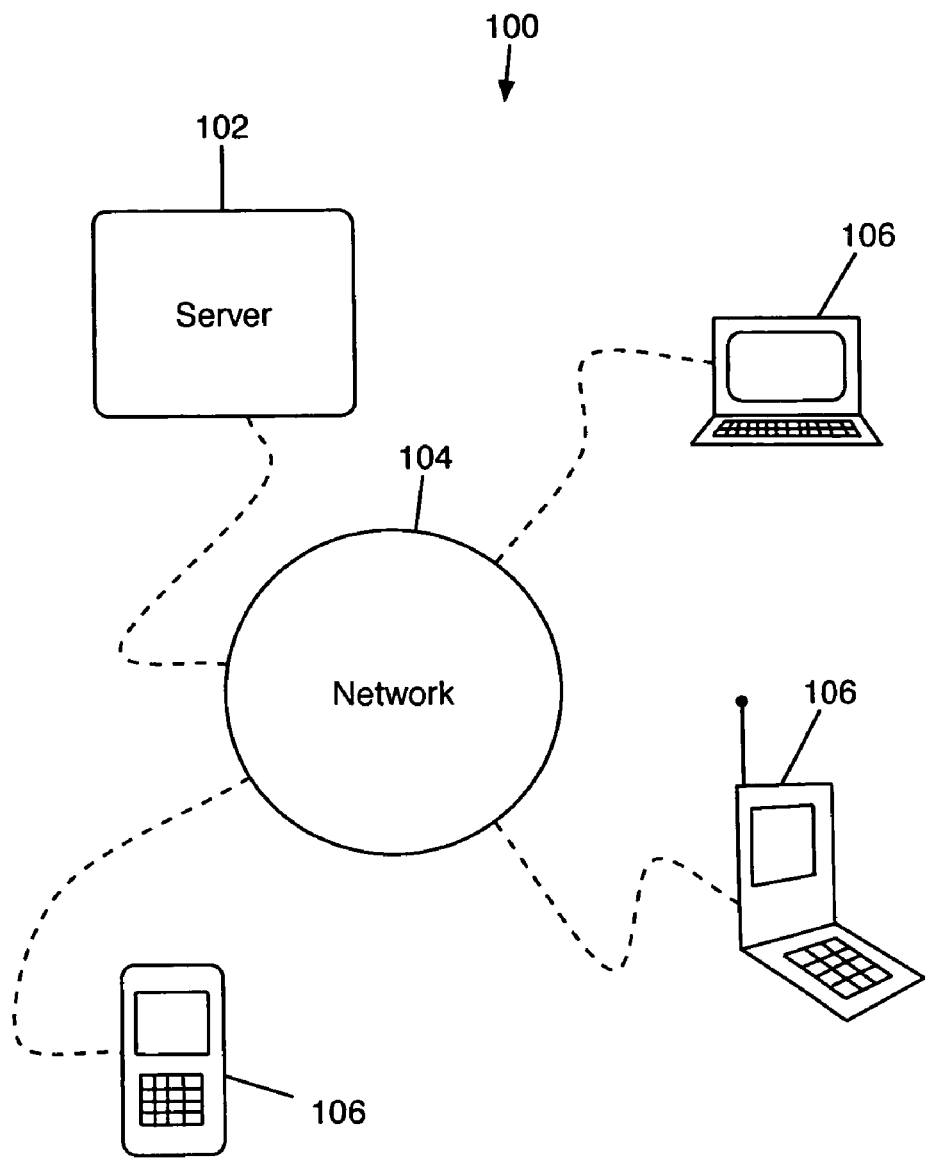
FIG. 1 is a diagram showing an environment for using an authoring application in accordance with the subject disclosure.

The present invention overcomes many of the prior art problems associated with creating, sharing and distributing electronic content over distributed computing networks. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring now to the FIG. 1, there is shown a block diagram of an environment 100 for implementing the methodology of the present disclosure. The environment 100 is hosted by an entity so that a plurality of users can create, distribute and control electronic content. The following discussion describes the structure of such an environment 100 but further discussion of the applications program and data modules that embody the methodology of the present invention is described elsewhere herein as would be appreciated by those of ordinary skill in the pertinent art.

The environment 100 includes one or more servers 102 which communicate with a distributed computing network 104 via communication channels, whether wired or wireless, as is well known to those of ordinary skill in the pertinent art. In a preferred embodiment, the distributed computing network 104 is the Internet. In another preferred embodiment, the distributed computing network 104 is a local area network within the entity. For simplicity, only one server 102 is shown. A plurality of clients 106 is also connected to the distributed computing network 104 to allow a multitude of users to utilize the subject methodology.

The server 102 hosts multiple sites and houses multiple databases necessary for the proper operation of the methods and systems in accordance with the subject technology. The server 102 is any of a number of servers known to those skilled in the art that are intended to be operably connected to a network so as to operably link to the plurality of clients 106 via the distributed computing network 104. For example, the server 102 typically includes a central processing unit or cpu including one or more microprocessors such as those manufactured by Intel or AMD and memory operatively connected to the cpu. The memory can be any combination of random access memory (RAM), a storage medium such as a magnetic hard disk drive(s) and the like.

The memory of the server 102 may be used for storing an operating system, databases, software applications for execution on the cpu, and the like. In a preferred embodiment, the memory includes a bandwidth friendly and browser independent animation technology such as FLASH® available from Macromedia Inc. of San Francisco, Calif. Further, the memory includes an uploader applet for facilitating use of various files that may or may not be the same file type. The memory of the server 102 also typically controls booting and storing the operating system, as well as other applications or systems that are to be executed on the server 102 such as paging and swapping between the hard disk and the RAM. Software, code or software applications generally refer to computer instructions which, when executed on the cpu, cause interactions with operating parameters, sequence data/parameters, database entries, network connection parameters/data, variables, constants, software libraries, and/or any other elements needed for the proper execution of the instructions, within an execution environment in the memory of the server 102. Those of ordinary skill will recognize that the software applications and various processes discussed herein are merely exemplary of the functionality performed by the disclosed technology and thus such processes and/or their equivalents may be implemented in commercial embodiments in various combinations and quantities without materially affecting the operation of the disclosed technology.

The server 102 also includes other mechanisms and structures for performing I/O operations such as disk drives (not shown) and a modem for communicating with the distributed computing network 104. It is envisioned that the server 102 can utilize multiple servers in cooperation to facilitate greater performance and stability of the subject invention by distributing memory and processing as is well known. U.S. Pat. No. 5,953,012 to Venghte et al. describes a method and system for connecting to, browsing and accessing computer network resources and is herein incorporated by reference in its entirety. Similarly, U.S. Pat. No. 5,708,780 to Levergood et al. describes an Internet server which controls and monitors access to network servers and is also herein incorporated by reference in its entirety.

Referring still to FIG. 1, distributed computing network 104 may include any number of network systems well known to those skilled in the art. The distributed computing network 104 can be a series of network nodes (each node being a digital data processing device, for example) that can be interconnected by network devices and communication lines (e.g., public carrier lines, private lines, satellite lines, etc.) that enable the network nodes to communicate. The transfer of data (e.g., messages) between network nodes can be facilitated by network devices such as routers, switches, multiplexers, bridges, gateways, etc. that can manipulate and/or route data from an originating node to a destination node regardless of any dissimilarities in the network topology (e.g., bus, star, token ring, etc.), spatial distance (local, metropolitan, wide area network, etc.), transmission technology (e.g., TCP/IP, Systems Network Architecture, etc.), data type (e.g., data, voice, video, multimedia, etc.), nature of connection (e.g., switched, non-switched, dial-up, dedicated, virtual, etc.), and/or physical link (e.g., optical fiber, coaxial cable, twisted pair, wireless, etc.) between the originating and destination network nodes. For example, distributed computing network 104 may be a combination of local area networks (LAN), wide area networks (WAN), or the Internet, as is well known. For the Internet, the preferred method of accessing information is the World Wide Web because navigation is intuitive and does not require technical knowledge.

The environment 100 also includes a plurality of input/output devices or clients 106 such as desktop computers with printers, laptop computers, personal digital assistants, cellular telephones and the like. The clients 106 communicate with the distributed computing network 104 to allow users to access information on the server 102. For simplicity, only three clients 106 are shown. In the exemplary illustration shown, server 102 may be located almost anywhere. Similarly, clients 106 are also capable of being interconnected over great distances and/or directly to server 102 as would be known to those of ordinary skill in the art.

The clients 106 have displays as would be appreciated by those of ordinary skill in the pertinent art. The display may be any of a number of devices known to those skilled in the art for displaying images responsive to signals. Such devices include but are not limited to cathode ray tubes (CRT), liquid crystal displays (LCDS), plasma screens and the like. Although a simplified diagram is illustrated in FIG. 1 such illustration shall not be construed as limiting the present invention to the illustrated embodiment. It should be recognized that the signals being outputted from the clients 106 can originate from any of a number of devices including PCI or AGP video boards or cards mounted within housings of the clients 106 that are operably coupled to the microprocessors and the displays of the clients 106.

The clients 106 are also preferably equipped with an input device(s) as is known to those skilled in the art which can be used to provide input signals for control of applications programs and other programs such as the operating system being executed on the clients 106. In illustrative embodiments, the input device preferably comprises a switch, a slide, a mouse, a track ball, a glide point or a joystick, a microphone or other such device (e.g., a keyboard having an integrally mounted glide point or mouse) by which a user such as a consumer can input control signals and other commands. Although the use of a keyboard and mouse as an input device for the server 102 and clients 106 is not described further herein, it is within the scope of the present invention for the input device to comprise any of a number of input means known to those skilled in the art, wherein the control signals or commands for implementing and interacting with the environment 100 and the applications program embodying such methodology can be implemented in the form of commands from an input device.

The clients 106 typically include a central processing unit including one or more micro-processors such as those manufactured by Intel or AMD, random access memory (RAM), mechanisms and structures for performing I/O operations (not shown), a storage medium such as a magnetic hard disk drive(s), a device for reading from and/or writing to removable computer readable media and an operating system for execution on the central processing unit. According to one embodiment, the memory of the clients 106 is for purposes of booting and storing the operating system, other applications or systems that are to be executed on the computer, paging and swapping between the hard disk and the RAM and the like. In one embodiment, the application programs reside on the memory for performing the functions in accordance with the subject disclosure. In another embodiment, the memory simply has a browser for accessing an application hosted within the distributed computing network 104. The clients 106 can also utilize a removable computer readable medium such as a CD or DVD type of media that is inserted therein for reading and/or writing to the removable computer readable media. As would be appreciated by one or ordinary skill in the pertinent art, a schematic diagram of a client 106 would indeed be functionally equivalent to a schematic diagram of a server 102.

It is also envisioned that a clients 106 provide administrative access to the environment 100 whereas clients 106 are associated with the entity and users although it will be recognized by those of ordinary skill in the art that the hardware of the clients 106 would often be interchangeable. A plurality of users can share the same client 106, although probably not conveniently at the same time, and cookie technology can be utilized to facilitate access to the environment 100 and, thereby, systems and methods conducted in accordance with the subject disclosure.

Typically, a user utilizes the subject technology via a personal computer client 106 but a cell phone, personal digital assistant and like devices now known and later developed are equally as usable. At such client 106, the user is presented with a plurality of screens or views. Each screen may have one or more tools for allowing the user to accomplish various tasks as described below. The following description uses the term view and interface interchangeably as would be appreciated by those of ordinary skill in the pertinent art.

Canvas View

Figure 1A:
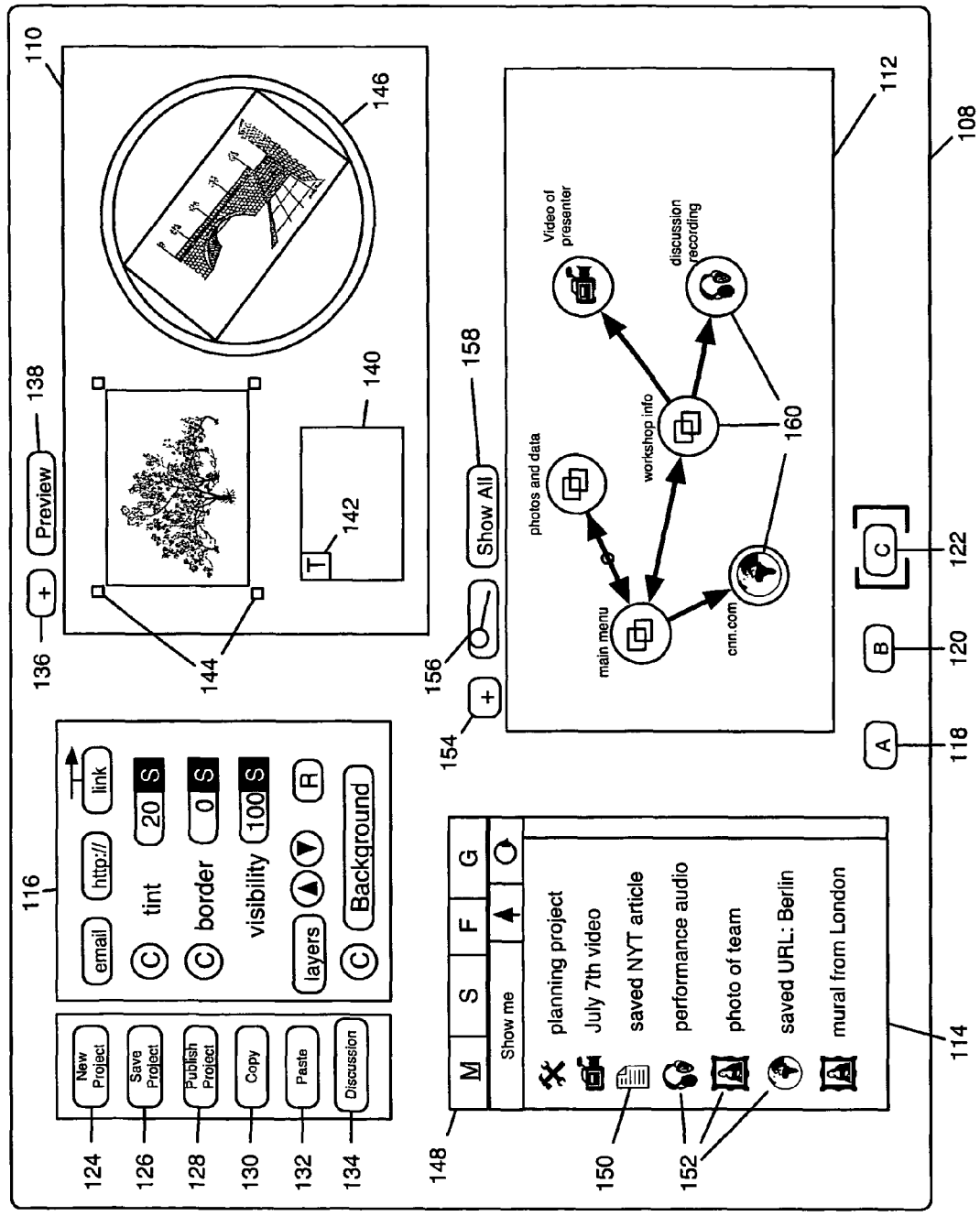
FIG. 1A is an exemplary screen of a canvas view of an authoring application in accordance with the subject disclosure.

Referring to FIG. 1A, a canvas view 108 or interface 108 contains the following four major components: the canvas 110, which represents the individual web screen that the user is constructing or editing; resources 114, which contain changeable, filterable lists of the user's multimedia resource files 152 that can be accessed and used in constructing web projects; properties 116, which opens an appropriate set of tools whenever a screen element in the canvas 110, such as an image or a block of text, is selected or when any other element in the invention is selected that activates tools; the path 112, which contains nodes 160. The nodes 160 are icons that represent (a) web screens created through the canvas 110, (b) individual resource files of different types that are not included in a project web screen but that can be opened in another browser screen or downloaded and opened in the appropriate application on the users' computers, (c) links to web addresses, and (d) links to email addresses that open email applications on the users' computers and allow emails to be sent to specific addresses. The path 112 is a form of self-generating sitemap that is used in the construction process primarily for making, editing, and deleting links.

Users construct web screens by dragging resource files 152 represented as icons in list form in the resources 114 into the canvas 110 and reconfiguring and transforming the resource files 152. For example, the user can drag an image by its icon from the resources area 114 into the canvas 110. The image then appears in the canvas 110. Dragging an image into the canvas 110 both opens the image in the canvas 110 and selects the image, so that the image is the active element in the canvas 110. As such, the image can be dragged to any location and positioned within the canvas 110. When an image is so selected, resizing handles 144 in the form of white squares appear at each of the respective corners. The image can be resized by dragging any one of the four resizing handles 144. The canvas 110 represents a smaller version of the whole browser screen, so what the user constructs in the canvas 110 will be expanded later in the reader view to fill the screen.

Figure 1B:
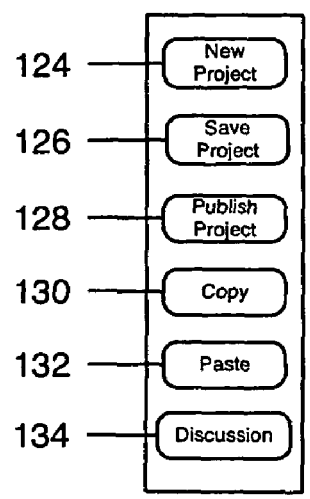
FIG. 1B is an exemplary screen of a configuration of tools for modifying images and placeholders and for constructing links in the canvas view of the application in accordance with the subject disclosure.
Figure 1B:
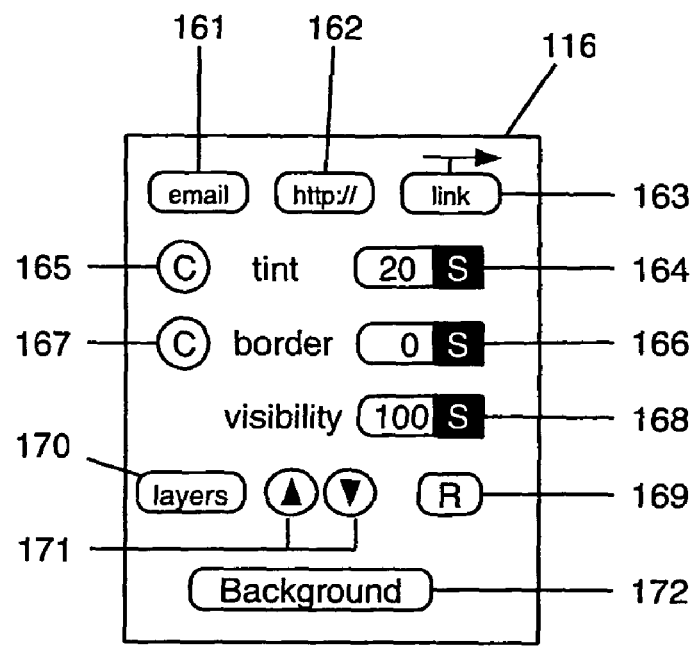

Referring to FIG. 1B, whenever an element in the canvas 110 is selected and active, the appropriate tools for modifying the element appear in properties 116. For example, when an image is selected in the canvas 110, the right-hand portion of the two-part properties 116 contains tools to modify the selected element. A border tool 166 allows the user to place a border around the image. The user can enter a number from 1-100 in the number input box to establish the thickness of the border, with the border increasing in width as the number grows and the number "0" being an element without a border. As an alternative means of generating a border around the image and establishing a desired thickness, the user can click on the small triangle on the right-hand side of the border tool 166 and thereby open a slider. Dragging the slider up or down increases or decreases the thickness of the border, while at the same time showing the corresponding number in the number input box. To the left of the border tool 166 is the color chooser icon 167, which opens the color chooser (FIG. 1E) and allows the user to select a color for, or modify the color of, the border.

The tint tool 164 gives an image a particular cast of color. The user may, for example, use the tint tool 164 to create a sepia tone effect for an image. The user accesses the color chooser through the color chooser icon 165 and selects a color to tint the selected image. In effect, the user is putting a form of colored scrim in front of the image and then modifying the transparency of that color plane. After selecting the desired color, the user affects this modification by entering a number from 1-100 in the number input box of the tint tool 164. As an alternative means of establishing the degree of the tinting, the user can click on the small triangle on the right-hand side of the tint tool 164 and thereby open a slider. Dragging the slider up or down increases or decreases the degree of tinting as well.

The visibility tool 168 allows the user to modify the opacity of the image and thereby to allow what is behind the image to show through to a desired degree. In the same manner as for the tint tool 164 and the border tool 166, the visibility tool 168 offer the user both a number input box and a slider to establish the degree of transparency/opacity.

Referring to FIG. 1A and FIG. 1B, the rotation tool icon 169 turns on and off the rotation tool 146 in the canvas 110. The white circular band around the diagonal image (FIG. 1A) is the rotation tool 146, that is used to rotate the image to a diagonal orientation. When the rotation tool 146 is on, any selected image (or any other selected screen element in the canvas 110) with have a white circular band circumscribing the image and intersecting the corners of the image. Dragging the rotation tool 146 around an axis thereof rotates the image, or other screen element, there within. When the rotation tool icon 169 is used to turn off the rotation tool, 146 the rotation tool 146 no longer appears in the canvas 110 around selected screen elements, and the elements cannot be rotated.

Referring again to FIG. 1B, the layers arrows 171 and the layers pallet 174 (FIG. 1C) can work independently, or be used in conjunction to allow the user to change the z-depth of a screen element, thereby moving the selected screen element in front of or behind other screen elements. For example, the layers arrows 171 and the layers pallet 174 allow users to manipulate the z depth of images in order to create a collage of overlapping images or to place text over other screen elements. To utilize the layer arrows 171, the user first selects the screen element to be shifted and then clicks on the up arrow to move the screen element up one layer in the hierarchy of screen elements, or the user clicks on the down arrow to move the screen element down one layer in the hierarchy of screen elements. To open and use the layers pallet 174 as well, the user clicks on the layers pallet icon 170.

Referring to FIG. 1C the layers palette 174 presents all the layers in canvas 110 (FIG. 1A) in slices 175, each slice 175 showing one screen element. Each slice 175 shows a smaller depiction of the actual screen element in accurate x and y coordinates. Slices 175 are stacked in a column that represents their z-depth order from top to bottom. Each slice 175 is slightly tilted so that the user sees the screen element in its specific location within the screen. The slices 175 are compressed near the bottom and near the top of the column and expanded in the middle to make viewing easier when there are a large number of screen elements. Dragging the slider 177 up or down enables the user to scroll through the column of slices and to view all the slices 175 in the expanded center space. To change the layer of a screen element, the user can drag a slice 175 up or down the column to place the slice 175 and the screen element contained therein at a different z-depth. The layers pallet 174 is easier and more efficient than the layers arrows 171 for moving screen elements up or down a number of layers. However, the layer arrows work in conjunction with the layers pallet 174, so that if the user selects a screen element and presses the up arrow, the slice 175 with that screen element will move up the column one place, or down the column one place if the down arrow is clicked once. Changes made in the layer order by dragging slices 175 up or down the column of slices 175 in the layers pallet 174 are immediately visible in the canvas 110.

Referring again to FIG. 1B, a background tool 172 allows users to select an image that has been dragged into the canvas 110 and make it into a background that fills the screen under construction. The resulting background image can be further modified with the tint tool 164 and the visibility tool 168.

The user begins a new project with a new screen open and ready for construction in the canvas 110 (FIG. 1A) and with the single node that represents that screen visible in the path 112 (FIG. 1A). The user can add more nodes to the path 112 by clicking on the "add a node" button 154 at the top of the path 112. Each new node represents an additional new screen in the project. Double clicking on any node in the path 112 opens it's screen in the canvas 110, replacing any other screen that was open at the time.

Referring to both FIG. 1A and FIG. 1B, the linking tool icon 163 enables users to link a screen element in the canvas 110 to another screen. For example, the image of a button in one screen can link or display another screen when selected by the user. Similarly, the link could be text that is blue and underlined or other features as would be known to those of ordinary skill in the art. In the reader interface, such links are typically on and other features may or may not be accessible by the user.

In a preferred embodiment, the process of creating a link involves connecting any screen element to serve as the button that triggers the link to the selected node, such as one of the nodes 160, that represents the destination screen in the path 112. To be able to make such a link, the path 112 must contain at least two nodes. One represents the current screen that is open in the canvas 110, and the other represents the destination for the link. To create such a link, the user selects the desired screen element in the canvas 110. Then from the linking tool icon 163, the user begins dragging in the direction of the path 112 and the destination node. Immediately upon beginning the dragging motion from over the linking tool icon 163, an arrow appears on the canvas view 108, such that the arrow's tail is anchored in the screen element that is the selected link, and the head of the arrow originates at the linking tool icon 163 and moves with the dragging motion toward the path 112. The user drags the head of the arrow down into the path 112 and over the node of the destination screen. Visually the user sees an arrow from the selected screen element in the canvas 110 to the selected node in the path 112. The node that has been contacted will change color to indicate that a connection has been made, at which time the user drops the head of the arrow. The bold linking arrow that has shown the direct connection between the selected screen element in the canvas 110 and the destination node disappears, and a small arrow automatically is drawn from the node in the path 112 representing the screen that is currently open in the canvas 110 to the node in the path 112 representing the destination screen of the link.

In addition to dragging resources, supported by such applications as FLASH®, in the canvas 110 and making them part of a project screen, the user can drag any resource file type directly into the path 112 and link to the resource using the linking tool 163. In reader view, when a visitor clicks on a linked button to activate the link, the file will open in a new browser window, or if that is not possible because of the file type, the file will download to the user to be opened in the appropriate application on the user's computer. The ability to drag any file type into the path 112 and link thereto enables users to share file types not normally associated with web construction, such as word processing, spreadsheet, and database files. It is an advantage to the user to be able to share these file types directly and not to have to convert them into web screen/Flash-compatible resources. Resources with these file types are referred to within the application as foreign files.

After such a link is created between a screen element and a node, the link can be deleted in three ways. It can be deleted by selecting the arrow in the path 112 that joins the two involved nodes and then using the delete key on the user's computer to delete the arrow. The arrow disappears, and the link is erased. The link can also be deleted by deleting the screen element in the canvas 110 that is the triggering half of the link. Deleting the screen element from the canvas 110 deletes the link as well as the arrow depicting the link in the path 112. The link can also be deleted by deleting the node representing the destination screen in the path 112, which likewise deletes the link and the arrow in the path 112. The user can change the destination of a link and have the chosen screen element in the canvas 110 open a different screen or download a different resource file by dragging the arrowhead of any link from one node to another node in the path 112. The arrowhead will affix itself to the new node and thereby change the link.

Referring still to FIG. 1B, a web linking tool 162 is used to link a selected screen element in the canvas 110 to the web address of any desired web screen outside of the project under construction. The user selects a screen element in the canvas 110, for example, the image of a button or text in a menu, and then clicks on the web linking tool 162, which opens a text input box. The user types or pastes a web address into the text input box. The entry into the text input box can then either be cancelled or the web address can be submitted to create the link to the external web screen. Initiating such a link through the web linking tool 162 triggers the drawing of a new node in the path 112 that represents the external web screen and the drawing of an arrow in the path 112 from the node representing the screen open in the canvas 110 to the new node representing the external web screen.

Another tool that initiates links is the email tool 161. The user selects a screen element in the canvas 110, for example the image of a button or a block of text, and then clicks on the icon of the email tool 161. That action opens a text input box, into which the user can write or paste an email address. The text input box can then either be cancelled or the email address can be submitted to create the link. Initiating such a link through the email tool 161 triggers the automatic drawing of a new node in the path 112 that represents the email address and the drawing of an arrow in the path 112 from the node representing the screen open in the canvas 110 to the new node representing the external web screen.

The new project button 124 in properties 116 initiates a new project. If a screen in another project is currently under construction, the user gets a prompt to save changes before closing. Then the canvas 110 opens with a new blank screen ready to have resources dragged into it and modified, and the path 112 contains the single new node that represents the new screen open in the canvas 110. Properties 116 contains a save project button 126 that allows users to save changes in the project currently under construction for later retrieval.

Referring back to FIG. 1A, none of the links that are created through the different linking tools are active in the canvas view 108, the project construction and editing mode of the application. The user can shift the screen that is under construction into the reader view (FIG. 5) by clicking on the view button 138 on the canvas 110. In effect, the canvas 110 expands to fill the whole screen and shifts from the construction mode to the reader view. In the reader view, the user can no longer move or resize screen elements or access any tools in properties 116; however, all the links are active and can be previewed. The user can move through the succession of linked screens, access a sitemap, and by clicking again on the view button 138 in the reader view, return to the canvas view 108. Returning to the canvas view 108 from its full screen presentation in reader view, the canvas contracts and the canvas view 108 reappears.

The "add a placeholder" button 136 of the canvas 110 drops a placeholder 140 into the canvas 110. The placeholder 140 is a white, partially transparent rectangle that serves as a multipurpose screen element. Placeholders can be moved and resized in the canvas 110 in the same manner as images. When a placeholder is selected, the selection brings up the same tools in properties 116 as an image and can in the same manner as an image have borders added and modified in thickness and color and have tint, transparency, rotational orientation, and z-depth modified.

In the canvas 110, a placeholder can function in the following ways:

(a) as a colored shape, e.g., as a design element in the screen;

(b) in the design process, the placeholder can be used to mark the position of an image. An image icon from resources 114 can be dragged over a placeholder and released, which will open the image in the space that the placeholder occupied and replace the placeholder; and (c) clicking inside placeholder 140 makes the text icon 142 visible, clicking on the text icon 142 replaces the text icon with a cursor in the upper left hand corner of the placeholder, enabling the user to type text directly into the placeholder, paste text in after copying it from an external source. Also dragging the icon of the text resource 150 into the placeholder 140 will paste its text into the placeholder. If the text requires more space than the placeholder provides, a scrollbar is added to placeholder.

When the placeholder 140 contains text, the user can select either placeholder 140 itself by clicking on its border or select part of or all of the text contained therein by dragging the cursor across the text. Selecting placeholder 140 brings up the tools in properties 116 for placeholders, which are the same as for images. Among other modifications, the user can drop the visibility number of placeholder 140 to zero using the visibility tool 168, which makes placeholder 140 disappear and the text appear alone above whatever was behind placeholder 140. In this manner, a user can place text over an image or other background graphic. Rolling the cursor over the text in placeholder 140 when the placeholder 140 is invisible will bring up a red border delineating the outline and position of placeholder 140 and signal that the user is engaging placeholder 140. Clicking on the red border selects placeholder 140 and opens appropriate tools in properties 116, making it possible for the user to make the placeholder visible again and to modify placeholder 140 otherwise. While selected in this manner, placeholder 140, although only visible through the outline of an outer border, can be moved by dragging and/or resized using the resizing handles 144. Moving placeholder 140 moves the text that is there within as well, and resizing the placeholder resizes the area filled by the text and reconfigures the text to conform to that area. If changing the size of placeholder 140 makes the area too small to accommodate the text, a scrollbar will appear on the right edge of placeholder 140, making it possible to scroll through the text.

Figure 1D:
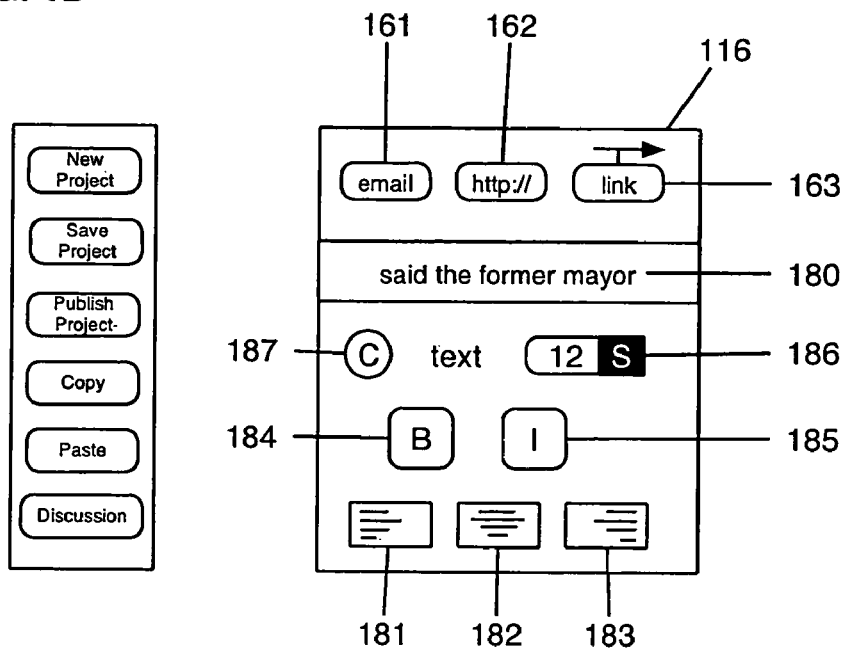
FIG. 1D is an exemplary screen of a properties configuration of tools in the canvas view for modifying and linking text in accordance with the subject disclosure.

Referring now to FIG. 1D and FIG. 1A, when the user selects text, properties 116 presents the same linking tools available for images and placeholders along with a set of text editing tools. To make a selected portion of text a link to another screen within the open project, the user follows the same procedures as for an image or placeholder. After selecting the text, the user drags from the linking tool icon 163 to the node of the destination screen, website, or resource file in the path 112, which creates an arrow that visually connects the selected text and the node representing the destination screen. After dragging and dropping the first arrow on the destination node, the second arrow is then generated in the path 112 from the node representing the screen that is open in the canvas 110 to the node that represents the destination of the link. The user can use the web linking tool icon 162 to link selected text to an external web address. After selecting a section of text, the user clicks on the web linking icon 162, which opens a text input box. The user can type or paste the web address in the text input box, making the selected text a link that opens the intended web screen. The user can likewise select text, click on email tool icon 161, and enter an email address in the text entry box that opens. The selected text becomes a link that opens the user's email client with the inserted email address designated as the recipient.

The display text window 180 shows the user the first three or four words of the text selected to be modified. The bold tool 184 makes normal text bold or reverses the modification and makes bold text normal. The italic tool 185 makes normal text italic or reverses the modification and make italic text normal. The font size tool 186 increases or decreases font size. The user writes a font size directly into the tool's number entry box to change its sizes, or the user clicks on the black triangle on the right side of the font size tool 186, thereby opening a slider, and increasing or decreasing the font size by sliding the slider up or down. The user aligns a block of selected text using the left justify tool 181, the center justify tool 182, or the right justify tool 183. The color chooser icon 187 opens the color chooser and allows the user to modify the color of selected text. Placeholders 124 have one additional function that is related to text. It is possible to select a placeholder 124 in the canvas and click on the discussion button in properties and thereby make the placeholder into a discussion thread, which continues to be a moveable and resizable screen element within the screen under construction. Conventional discussion threads appear in their own separate windows and not as a flexible screen element available to non-technical web authors. One advantage of being able to add discussion threads to web screens under construction is that it is possible to place a discussion thread next to the multimedia prompt that is designed to foster or inform the discussion. In one embodiment of the program, such a discussion thread could be left open for any web visitor who comes to it through its particular web address to post in it. In another embodiment, the web author could access the names of account holders from an alternative view of resources and link their names to the discussion thread, thereby defining the permission to post in the thread. The canvas view 108 allows the web author to create hyperlinked multimedia web screens which contain discussion threads within them as modifiable screen elements and, using the publish tool, immediately give one or more of those screens its own web address, allowing viewers access to the projects online and the ability to post in the discussions. In essence, the canvas view 108 alone empowers web authors to create one form of virtual community of sharers. In this instance the sharing is through putting documents online with open discussions, or discussions limited to selections from a list of account holders. Additional community-building capabilities exist through the canvas view 108 through the sharing of resource files and projects.

Referring again to FIG. 1A, it is possible to change the position of any node in the path 112 by dragging. If there are arrows connected to the node that is being dragged, the arrows reconfigure to the node's new position. The user can select multiple nodes by dragging a selection rectangle over them, which causes them to change color to indicate that the nodes have been selected. The user can then drag the selected set of nodes as a group. The set of nodes in the path 112 serves as the sitemap for a project in reader view, so the design of the nodes is of significance to the user. Nodes selected as a group can also be deleted. The icon for the zoom tool 156 allows the user to open the slider that expands or shrinks the entire set of nodes in the path 112, allowing the user to zoom in on a small selection of nodes, possibly to rename them, or to zoom out to make the entire set of nodes fill only a portion of the path 112. If the user selects a set of nodes by dragging a rectangle over them, then clicks on copy button 130, all content and links that fall inside the rectangle will be copied.

The paste button 132 enables the user to paste the copied nodes into the path 112, duplicating them in their original project, or the user can close the current project, open another project, and paste the selected nodes into the path 112. Copying, pasting, and linking nodes from different projects into a single project is the equivalent of copying parts of or all of multiple websites and combining the selections into a single website. It is also possible to copy and paste a single node. The show all button 158 best fits the set of nodes inside the path 112. The publish tool 128 allows the user to make any selected note accessible online with a unique web address. Clicking on the icon for the publish tool 128 opens a text input box, in which the user writes or pastes a segment of a web address. When the user closes the text input box, the selected screen that the node represents is accessible online. Reached through its new web address, the screen appears in full-screen reader view with all links active. It is possible to give any screen or any number of screens in a project a web address. The same project can have different online entry points.

Figure 1E:
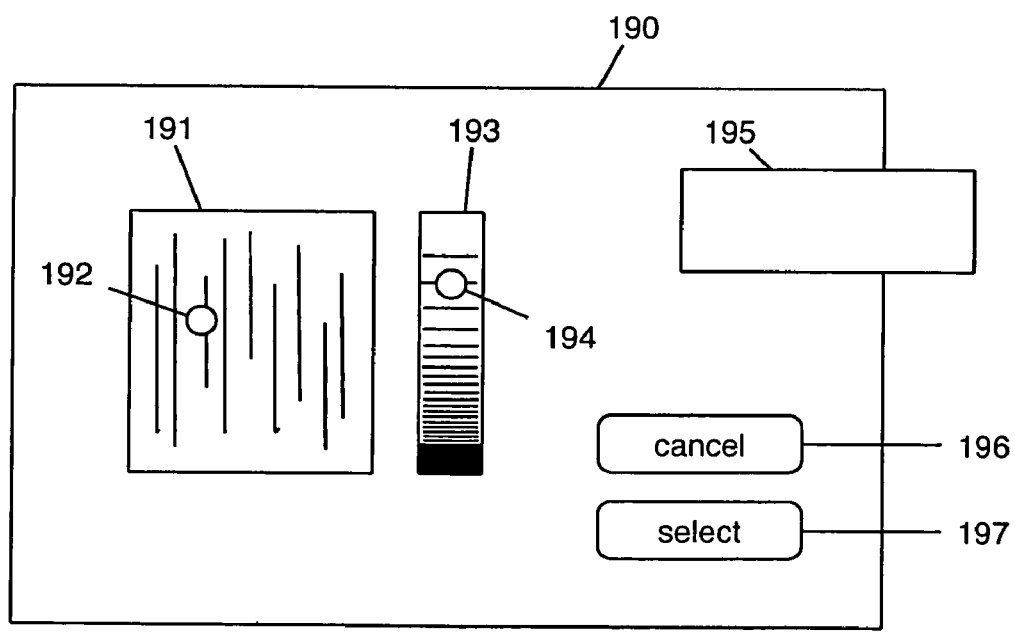
FIG. 1E is an exemplary screen of a color chooser in accordance with the subject disclosure.

Referring to FIG. 1E, the color chooser 190 allows the user to change the color of text, placeholders, screen backgrounds, borders, and folders. The color chooser 190 has two color modification boxes 191, 193. The first, the hue and intensity box 191 shows a range of different hues, or colors (red, yellow, green, blue, etc.), ranged horizontally from left to right, such that dragging the color selector circle 192 horizontally allows the user to select a color from the continuous spectrum that is presented. While the hues vary horizontally, their intensity, or brightness, varies vertically, so that the user can likewise drag the color selector circle 192 up to increase color intensity or down to decrease it. The second color modification box, the white scale box 193, contains a white scale selector circle 194, which the user can drag upward to change the color that is selected in the hue and intensity box 192 closer to white or downward to change the selected color closer to black. Sample box 195 allows the user to preview his color selection. The user can cancel the selection process with cancel button 196 or implement the selection using select button 197.

As presented in the canvas view 108, resources 114 contain the resources selection bar 148. Each of the letters in the resources selection bar 148, M, S, F, and G, stands for a different set of resources, each visible in a different configuration of resources 114. The individual letters in resources selection bar 148 stand for My resources, Shared with me, my Folders, and Groups and Users. In the canvas view 108, the user can access any one of the four sets of resource information using the resources selection bar 148, but only one set at a time. Moving from the canvas view 108 to the resources view 200 opens all four sets of resources in four panels side-by-side. At the bottom of the canvas view 108 there are three buttons: the canvas view button 122, the resources view button 120, and the calendar view button 118. As depicted in FIG. 1A, the canvas view button 122 has white parentheses surrounding it, indicating that that is the current view. When the user clicks on the resources view button 120, the screen transitions into the resources view 200. The canvas 110 and the path 112 slide laterally to the right and disappear off the screen, resources 114 expands into its four components, and properties 116 moves to the middle of the screen.

Resource View

Figure 2A:
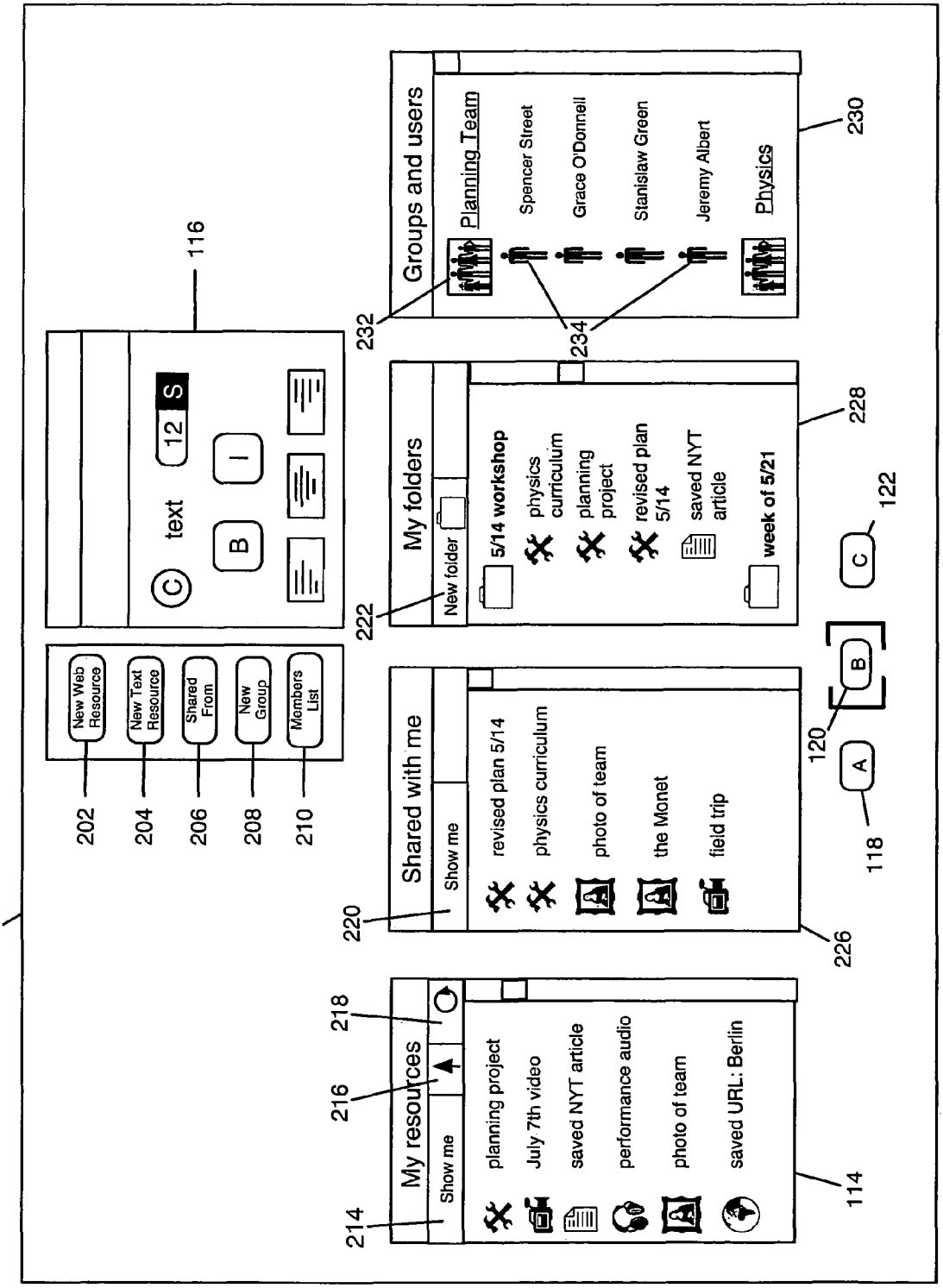
FIG. 2A illustrates the resources interface and associated tools for managing and sharing resources, creating user accounts, and creating and managing user groups and membership in respective groups in accordance with the subject disclosure.

Referring to FIG. 2A, the resources interface 200 and associated tools for managing and sharing resources, creating user accounts, and creating and managing user groups and membership in respective groups is shown. In its expanded form, the resources selection bar 148 spells out the complete name for each of the four resources panels: my resources 114, shared with me 226, my folders 228, and groups and users 230. In addition to the four resources panels, the resources view 200 includes properties 116.

My resources 114 is the user's master list of the projects that he created, and the resource files that he uploaded or pasted to save. The contents of my resources 114 is filterable by type. The show me window 214 drops down a list of the following filters: all; projects; images; movies; sounds; pasted text; websites; TR extras; and foreign files. Selecting any one of the filter option in the show me window 214 list filters the list by that type.

Referring still to FIG. 2A, the new web resource button 202 saves web links for future use. The user copies the desired web address from the browser address bar, clicks on the new web resource button 202, and pastes the web address into the text entry box that appears, or the user types the web address in the text entry box. The web address will appear in my resources 114 after the user clicks on the refresh button 218 and updates the contents. The user can save text for future use in a similar manner by copying the text, clicking on the new text resource button 204, and pasting the text into the text entry box that appears. The user can type the text in directly as well. Both the new web address and text resource will appear in my resources 114 with appropriate icons and be filterable by type. Different filterable file types have distinctive icons. One of the filterable file types, TR extras is a collection of background images, buttons, and other useful resources that are supplied with the software and that all users can access. It is possible to develop different libraries of TR extras for different clients.

In the my folders 228, the user can create his own filing system and personalized storage architecture. Clicking on the insert folder button 222 drops an empty folder into the my folders 228. The user can name folders, nest folders in folders, and set up a storage system for the individual ordering of resources and projects. My folders 228 is initially empty. The user adds folders and drags any projects and resources from my resources 114 into my folders 228. Dragging the project icons and resource icons from my resources 114 into my folders 228 creates a reference, an alias, so that the project and resource files appear in both lists without the files being duplicated. While creating a project in the canvas view 108, the user can access resources from my folders 228. Rather than seeking out resources spread out by type in my resources 114, the user has the option of storing all the diverse resources needed for a single project, regardless of type, in a single folder or hierarchy of folders in the my folders window 228.

Figure 2B:
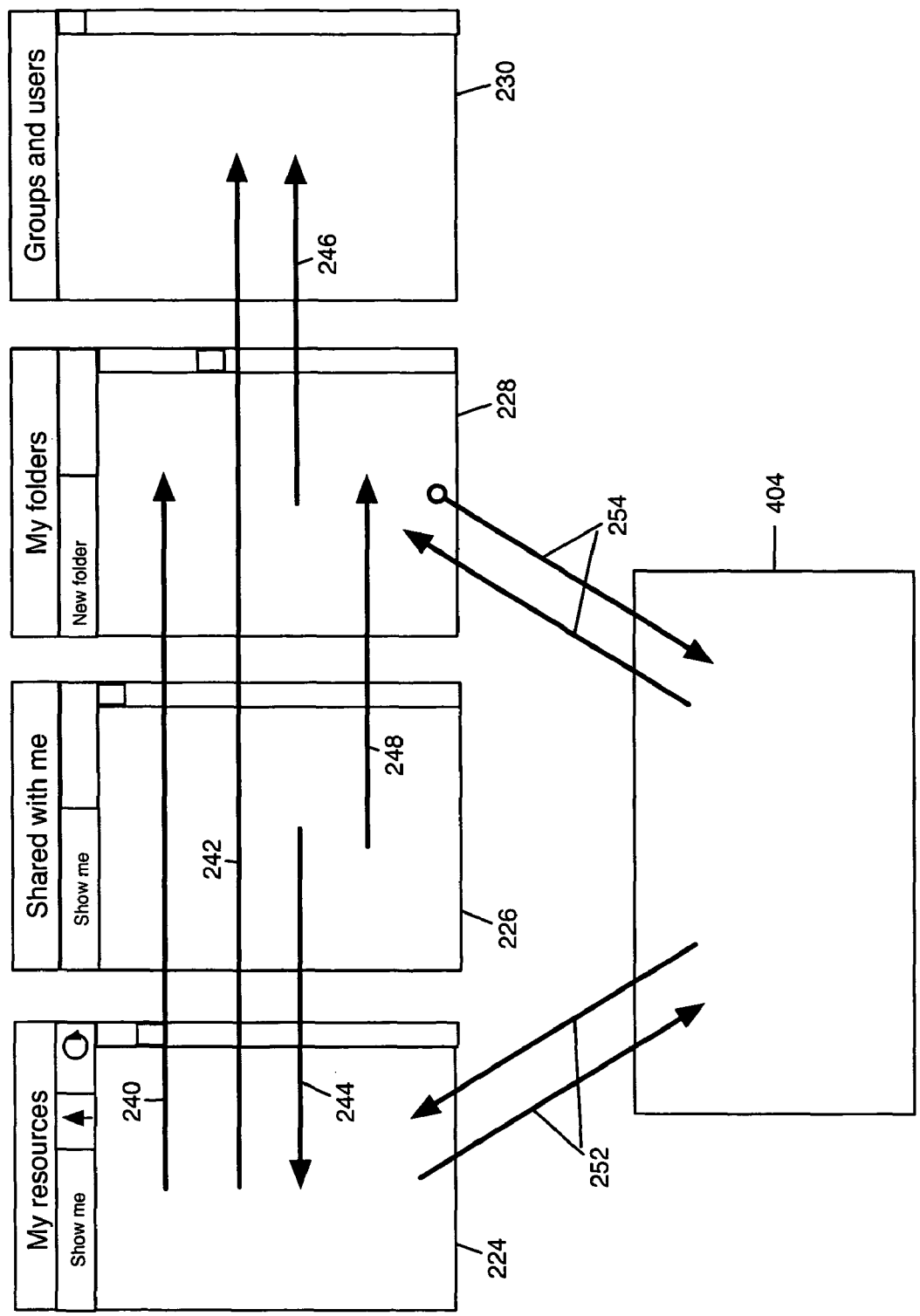
FIG. 2B is a somewhat schematic diagram illustrating different drag and drop functions in the resources view in accordance with the subject disclosure.

Referencing FIG. 2B, a somewhat schematic view of FIG. 2A is shown to illustrate dragging and dropping. The resources view 200 has a variety of different drag and drop functions. The example of moving files from my resources 114 to my folders 228 is show as drag and drop 240. Groups and users 230 is the resources list that shows the groups to which the user belongs and the individual members in each group. In drag and drop 242, dragging any project or resource from my resources 114 and dropping the project or resource on the icon of a group or individual member in groups and users 230 shares that file with the selected recipient. It is possible to drag and drop multiple projects and resources over any combination of selected groups and/or users and thereby sharing resources and projects. In drag and drop 246, users can follow the same procedure for sharing resources and projects as they did dragging files from my resources 204; however, in this instance, they drag files from my folders 228 and drop them over selected recipients in groups and users 230.

Resource files and projects which have been shared with the user by other group members appear in the "shared with me" window 226. In the canvas view 108 (FIG. 1A), users can access the resources and shared projects in the shared with me window 226 by clicking on the S in the resources menu bar 148. Then, users can insert shared resources in their projects. However, if the sharer of a project or resource deletes the project or resource, the project or resource will appear ghosted out in shared with me window 226, indicating that the project or resource is no longer accessible. If the shared resource has been used in a project, the resource will no longer be accessible. Shared resources listed in the shared with me window 226 are references, not copies of the original file. If the user wants to keep a shared file indefinitely, and that file carries therewith the permission to be copied, the user can drag the shared file from shared with me window 226 and drops in my resources 114. Through drag and drop 244 the user creates his own copy of the shared file, not a reference, so that he can keep his resource safely regardless of what the sharer does with his original file. Since there may be instances when shared materials are intended for a short span of usage, drag and drop 248 allows the user to drag files from shared with me window 226 and dropping them into my folders 228. Drag and drop 248 does not create a new, independent file, but as is the case with the other resources and projects in my folders 248, it creates a reference to the sharer's file. One advantage of moving shared files into the my folders window 228 is to cluster them with other related files that the user has ordered for project development.

Referencing FIG. 2A, the shared with me window 226 can be filtered using the show me 220, which drops down the same list of filters as the show me 214 (all, projects, images, movies, sounds, pasted text, websites, TR extras, foreign files). The shared from button 206 offers another filtering option relating to shared resources and projects. The user selects a resource and clicks on the shared from button 206. The sharer of the resource is then identified in groups and users 230. Inversely the user selects a member in groups and users 230, clicks on the shared from button 206, and all the files that that group member shared with the user are identified in the shared with me 226. Double clicking on any resource icon in the resources lists opens the resource for previewing in another browser window or downloads the resource to open in the appropriate application on the user's computer. Double clicking shared projects opens them in reader view. When the user opens one of his own projects by double clicking the respective icon, the project opens in the canvas view 108 for editing.

"User" has been used as a generic term for anyone using the application. The application, however, has different tiers of users based on different roles and sets of permissions. When individuals become account holders, the individuals are designated as either site administrators, managers, or basic users. Site administrators can create and modify accounts, access and modify all information in the database, and establish privileges for managers and basic users. Managers are users who can approve the creation of new accounts for basic users and create and manage groups of basic users. In an educational implementation of the application, managers could be teachers and students could be basic users. Basic users have access to the four different views, the canvas, resources, calendar, and reader views and whatever other privileges the site administrators have approved for them.

When a manager logs on to the application and opens his resource view, he sees the new group button 208 in properties 116, and he can utilize the new group button 208 to create new groups. Basic users do not see the button 208 when they log on, because they do not have the permission to create groups. When a user logs on to the online environment of the application, the configuration of the application that he sees is determined by the type of user he is and by any other individual modifications that have been made to his permissions.

To create a new group, the manager clicks on the new group button 208. A new icon for a group appears in groups and users 230. The new icon has the name "new group," which the manager can change. There are thee ways to add members to the new group. First, the manager can drag and drop the icons of members from his other groups onto the new group icon 232. The icons and names of the new members will appear under the new group's icon, as well as in the original groups from which they were drawn. This method for forming groups allows for the rapid creating, deleting, and recreating of a succession of diverse groups in complex planning processes. The method is ideal for addressing a staircase of sequential group problem solving tasks that require the recombining of different types of expertise.

In a second method of adding new members, the manager can send prospective members to a membership application screen (FIG. 2C) where they fill out the form and submit personal information. By submitting information, such as the manager's name, the group to which they are applying, their last names, first names user names, passwords, email addresses, addresses, and the like, the applicants are placed in a pending status. The information they submit is sent to the manager and appears in the new group's members list (FIG. 2D). The manager accesses the member's list for the new group by selecting the icon for the new group in groups and users 230 and then clicking on the members list button 210. At this point all the new members are in a pending status. After the manager has checked the list, made corrections, and deleted applicants who do not belong, he submits the new memberships. If any applicant is not already an account holder, this process opens an account for him as well as grants him membership in the group. If the applicant already has an account and membership in one or more other groups, he is simply added to the new group.

Referring to FIG. 2C, users can apply to be members of a new group and to receive an account if they do not already have one by going to a membership application screen 260 that is available through a web address, filing out a form, and submitting that information by clicking on a submit button 268. In addition to the member's own information 266, the applicant includes the unique username 262 of the manager who created the group and the group name 264. Submitting the form by clicking on the submit button 272 sends the information to the members list (FIG. 2D) for that group and creates an application pending status for the applicant. The manager checks for accuracy, completeness, and adherence to any group guidelines and then approves and submits the information in the members list 270. A new account is created for the applicant if necessary and the membership in the new group is instituted. The members list 270 also contains checkboxes that give the manager the ability to change specific privileges for individual users or all users in the group, the one example given being the ability to share resource files and projects with other users.

In another method for adding new members, the manager can bypass the membership application screen 260, go directly to the members list, and fill in the information for each applicant himself. As new members are added to the group, their names and member icons 234 are added to the information in groups and users 147. At any time, the manager can open the members list 270 for any group that he has created by selecting the group icon 232 in groups and users 230 and clicking on the members list button 208 in properties 116. The manager can then edit the information of members, as well as add and/or delete members. As new members are added to a group, their names appear in groups and users 230 next to member icons 234. Selecting the group icon 232 in groups and users 230 opens a group profile, which is project that the manager who created the group chose to put on line. The profile may explain the goals of the group, it's rules and regulations, prerequisites for application, or other salient information that the manager wishes to share with members. In like manner, double clicking on a member icon 234 opens an optional member's profile, which may contain a photograph and introductory information about the group member. The profiles allow new members to learn more about the groups they have joined and their fellow group members.

Referring to FIG. 2D, selecting a group icon in groups and users 230 opens the members list (FIG. 2C) for that group as a separate members list window 270. The members list window 270 is the group manager's tool for adding and deleting members and for editing members' information. The members list window 270 also contains checkboxes that give the manager the ability to change group-specific privileges for individual users, such as the ability to share resource files and projects with other users. When information has been added to the members list, either directly by the manager or forwarded from the membership application screen (FIG. 2C), the manager checks for accuracy, completeness, adherence to any policy guidelines and then submits it by clicking on submit button 272. Submitting the information to the database creates memberships and user accounts as well where necessary. After submitting the information for new group members through the members list, member icons and names appear under the group name in groups and users 230. In another embodiment, the members application screen 260 may also be the means whereby a person acquires an initial user account. Initially a person has to be accepted into a group to have an account activated.

Calendar View

Figure 4:
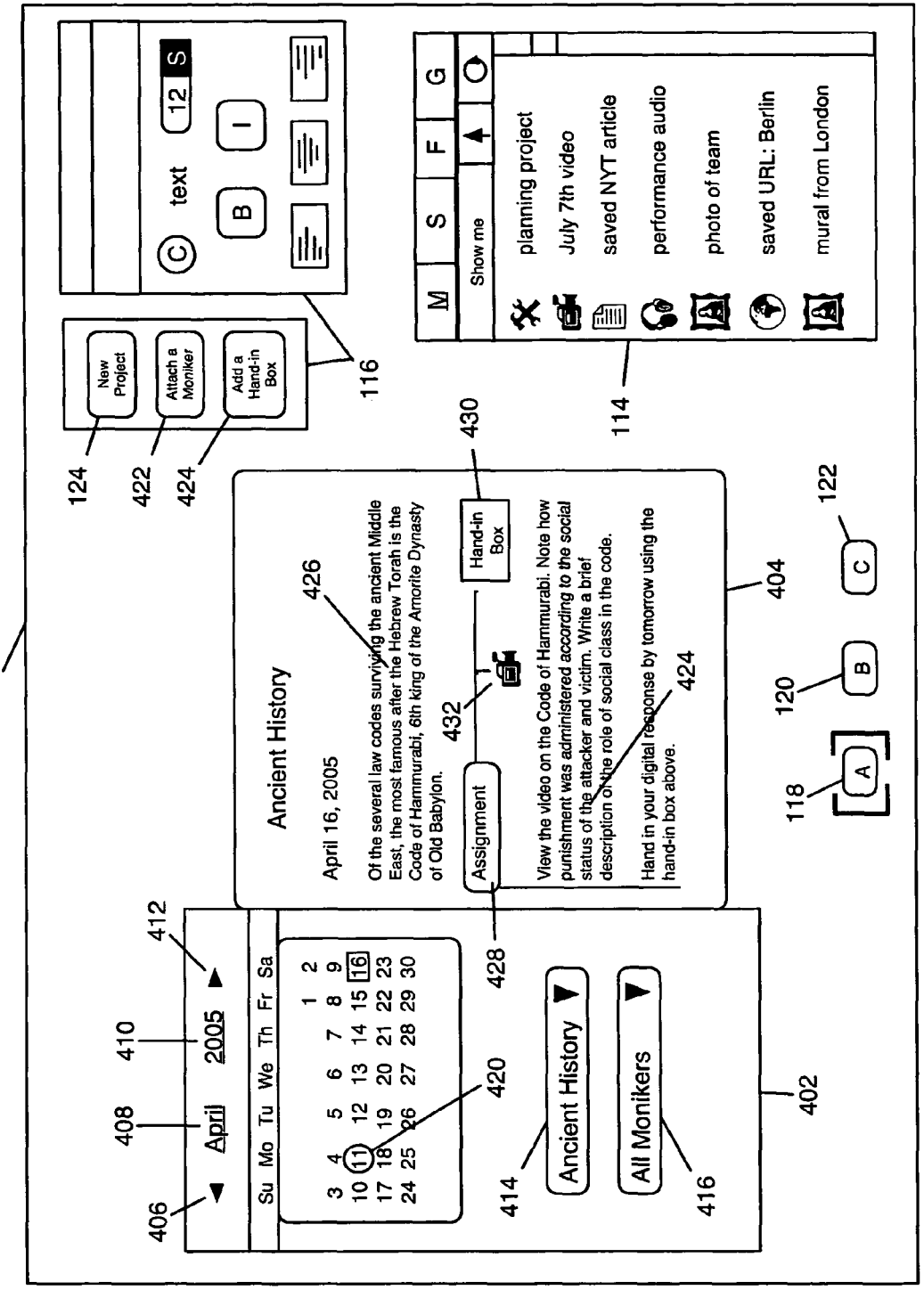
FIG. 4 is an exemplary calendar view, the interface and tools for sharing and receiving information from groups through calendar entries in accordance with the subject disclosure.

Referring to FIG. 4, the calendar view button 118 opens the calendar view 400. The resources view 200 (FIG. 2A) transitions into the calendar view 400 (FIG. 4). The four resource panels recombine into one and along with properties 116 slide to the right side of the screen. The calendar 402 and calendar viewer 404 slide onto the screen from the left edge.

In addition to the single resources pane 114 and properties 116, the calendar view 400 contains the calendar 402 and the calendar viewer 404 as other major components. The calendar view 400 supports the distribution and return of resources and projects through calendar entries and is a tool for chronological planning and group management.

At the top of the calendar 402 is the month back arrow 406. Each time the month back arrow 406 is clicked, the calendar 402 changes to show the previous month. The month forward arrow 412 does the opposite, showing the next month in the calendar 402 for each time selected. The month drop down window 408 allows the user to open a list of all twelve months and jump to any month in the year, which the calendar 402 will then present. The year drop down window 410 allows the user to open a list of years and to shift the calendar 402 to another year. The user can click on the number of any date in the calendar 402 and have entries and attachments for that day appear in the calendar viewer 404. The calendar 402 and the calendar viewer 404 allow the user to get calendar entries and attachments from every group to which the user belongs. When the calendar view 400 first opens, the calendar 402 has the current day, month, and year selected by default. As a result, the calendar viewer 404 shows the entries and attachments from all of the user's groups for that day. The group filter window 414 drops down to present the user with a list of the groups in which he is a member and allows the user to select a group and filter the information in the calendar viewer 404 to include calendar entries and attachments from only that group. Calendar viewer 404 shows a hypothetical example from a school with the group being a class. Log 426 represents the teacher's (i.e., manager's) initial text entry for the given day. Beneath the log 426 there is assignment 428, which contains a second text entry 424, as well as the attachment 432, which is a video file that was attached to the assignment. As is the case for any resource or project shared with a group through the calendar viewer 404, the student (i.e., basic user) can double click on the attachment in the calendar viewer 404 and open the attachment. The website resource in the example will open the website in another browser window.

The student also has the option of dragging the attachment 432 by its icon, or any other resource or project so attached, into my resources 114 or my folders 228. The assignment 428 contains a text entry 424. This capability is shown in FIG. 2B as drag and drop 252 for moving files into my resources 204 and drag and drop 254 for moving files into my folders 228 from calendar viewer 404. This particular assignment requests that the student return a response. In addition to the website resource, the assignment has return box 430 attached thereto. The student can drag any resource or project from my resources 114 or my folders 228 (FIG. 2A) over the return box 430 and send the resource back to the teacher. It is possible to access the different resource lists by using the resources menu 148 at the top of my resources 114 and the other resource windows.

Assignment 428 is an example of a moniker. Log 426 is another example of a moniker. Monikers can be text entries, attachments, or a combination of both. A moniker is a name given to a particular type of information shared through the calendar viewer 404. The purpose of monikers is to make information shared in the calendar view 400 filterable by type. The moniker filter window 416 drops down a list of monikers, and the user can select one or all of the monikers for filtering the contents of the calendar. When the user selects one moniker, only that type of information will be shown in the calendar viewer 404. Using the school example again, a student could use the filters for the calendar viewer 404 to see all of the assignments or all of the handouts for the month of April.

When a manager creates a group, he acquires the permission to make calendar entries for that group. If the manager opens the calendar viewer 404 for a particular day and for a particular group that he created, he can make a calendar entry for that date and group. The manager can immediately begin writing a log entry in a text entry box that appears in the calendar viewer 404. The attach a moniker button 422 in properties 116 lets the manager who created the group add monikers to the calendar viewer 404 beneath the log, assignment 427 for example. Attach a moniker button 422 in properties 116 drops down a window of moniker names, from which the manager can choose. After adding a moniker, the manager who crated the group can drag any resource or project from my resources 114 or my folders 228 and attach the file to the moniker. This capability is shown in FIG. 2B as drag and drop 252 for moving files from my resources 204 and drag and drop 254 for moving files from my folders 228 into the calendar viewer 404. In the calendar viewer 404, the example of such an attachment is video file 432, which has been added to assignment 428. By clicking on the hand in box button 424, the manager can add a hand in box to the moniker, for example hand in box 430 in assignment 428. The calendar entry for a particular day and group can have any number of different monikers, so the manager can add additional monikers, attachments, and hand in boxes if he chooses. After adding hand in box 424 to a moniker, the manager can click on hand in box 424 and open a drop down window that contains the names of all of the members in the group. As users send files to the manager, the return is indicated by a check mark near their names. Hand in boxes are also tools for keeping track of who has handed in a file. The resources and projects shared with the manager through hand in box 424 and visible through the dropdown window can be opened by double clicking on their icons.

In one embodiment, there are six different user types, or permission sets. Three are related to user accounts (e.g., system administrator, manager, and basic user) and three related to group membership (e.g., creator, moderator, and member). Only managers can create groups. When a manager creates a group, as its creator, he receives the permission for making calendar entries for that group. As the creator of a group, the manager assumes specific permissions, such as making calendar entries, and controlling access to the members list. The second group related designation is moderator. The creator of a group and give someone else the permission to make calendar entries, i.e., a moderator. A group member can modify the calendar. Finally there are group members, who in fact could come from any of the user account groups. A system administrator could be just a member of a group. An account holders permission set grants different permissions in different settings in the virtual community.

Reader View

Figure 5:
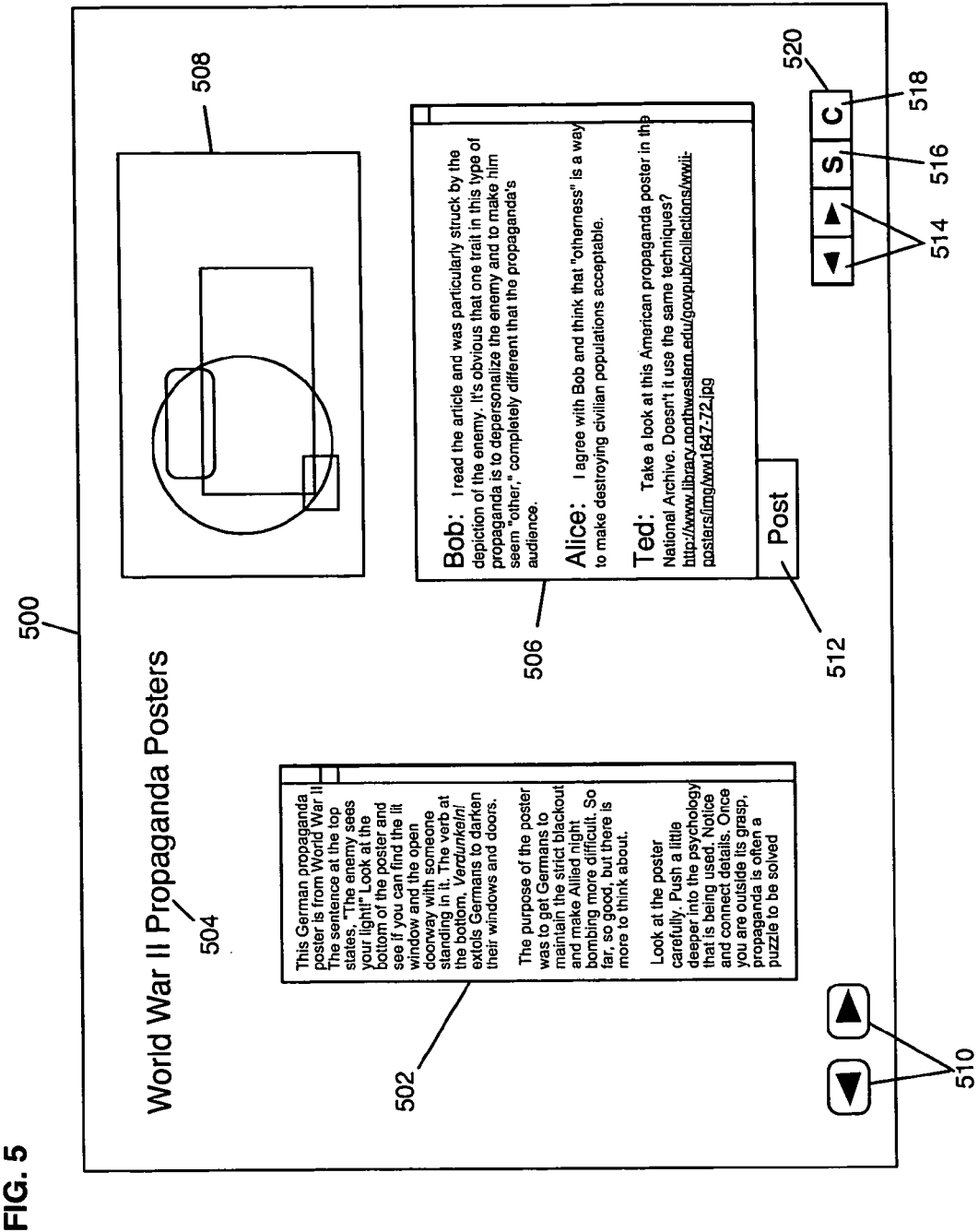
FIG. 5 is an exemplary reader view, which opens the projects created through the application in their full-screen, presentation mode with all navigation active in accordance with the subject disclosure.

Referring to FIG. 5, an exemplary reader view 500, which opens the projects created through the application in their full-screen, presentation mode with all navigation active, is shown. Reader view 500 is an example of a typical web screen, containing title 504, scrollable text 502, accompanying image 508, and discussion 506. The example is from an academic environment with the assumption that students would read the text, an analysis of a propaganda poster, which is shown in image 508, and respond through discussion 506. Students with the permission to post could click on the post button 512 and open a text input box, in which they could write or paste a response and submit it. The screen also contains next and previous buttons 510 to allow for moving to other screens in the project. The reader view menu bar 520 is the one element in the screen that is a permanent part of the reader view and appears on all screens in reader view. The reader view menu bar 520 can be dragged to any unobtrusive location on the screen. It contains history buttons 514 that allow the viewer to move backward or forward through the succession of project screens that he has visited. The sitemap toggle 516 opens and closes the sitemap, which is a smaller, truncated version of the path 112 that acts as an aid to navigation. The canvas view button 518 allows the user, if he has the permission, to shift the project screen being visited from the reader view to the canvas view 108 to modify it. In the academic example, the reader view 500 may be all that a student is allowed to use. Certain types of distributed materials may be partially locked but allow students to offer responses to questions. Students may also have the option to create and share projects as active participants in their classroom's or school's digital community.

The Uploader

Figure 3A:
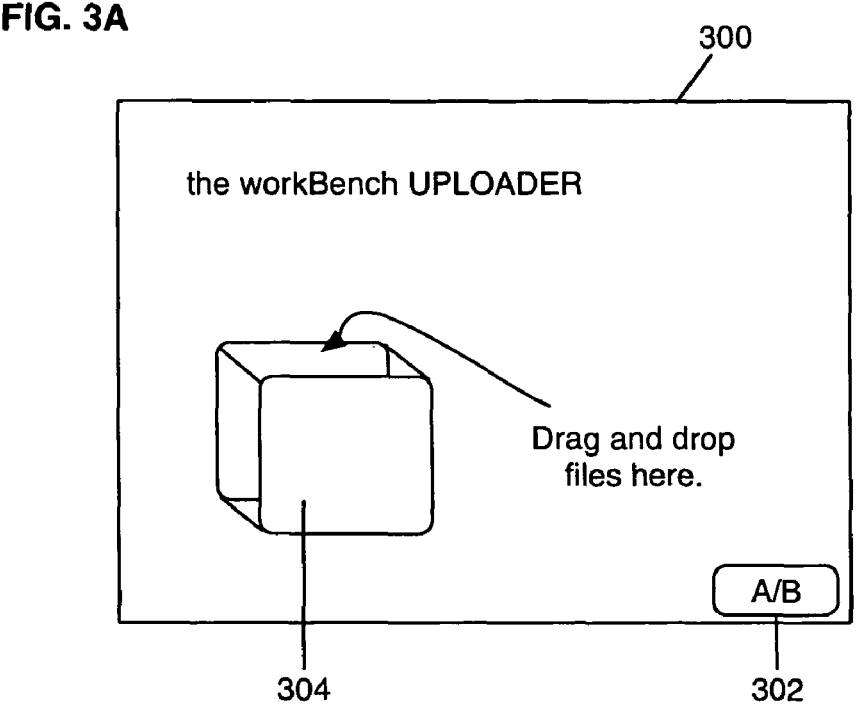
FIG. 3A illustrates an uploader applet graphic in accordance with the subject disclosure.
Figure 3B:
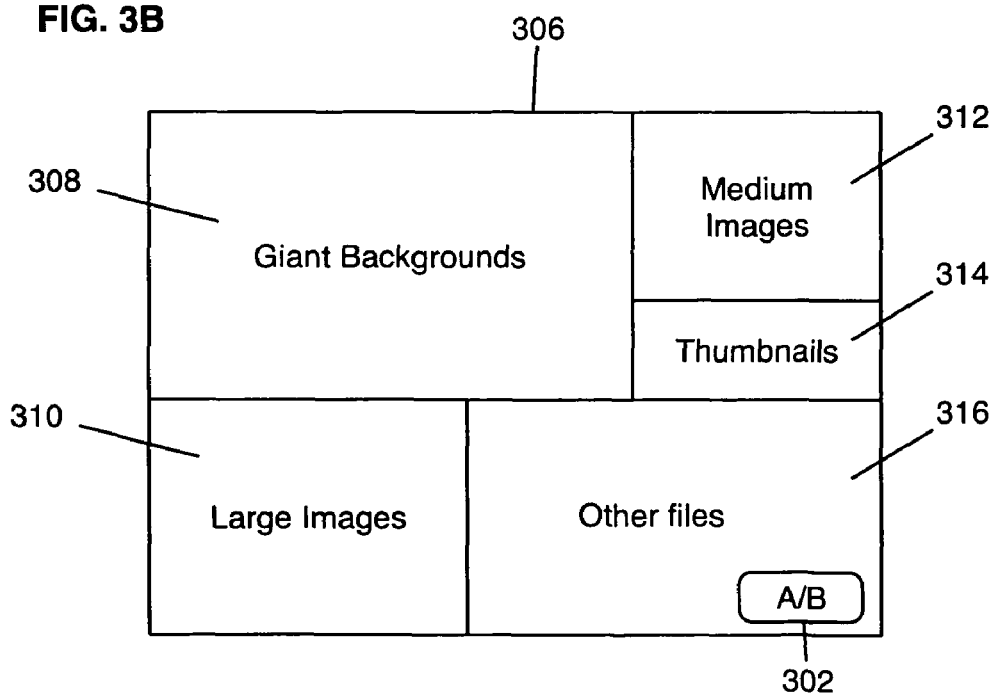
FIG. 3B illustrates a somewhat schematic view of the functional components of the uploader applet in accordance with the subject disclosure.

Referring to FIG. 3A and FIG. 3B, the user downloads an uploader applet by selecting an uploader button 216 (FIG. 2A) which is an arrow in the menu of my resources 114. After the uploader apple downloads to the respective client 106, the uploader graphic 300 appears on the user's desktop. The user can drag and drop any file or set of files of any file type onto the drop zone 304 in the uploader graphic 300 on his desktop and, thereby, upload the data to the server. Before uploading images, the uploader can converts GIFs, PNG.s, BMPs, and progressive JPGs to non-progressive JPGs, which can be used in the application's FLASH® environment. The uploader applet likewise reassembles those images to 72 dpi and to a maximum height and width appropriate for the Internet. The default height and width are established by the site administrator. As a result, for example, the uploader applet allows non-technical users to upload images from digital cameras and other very large image files that are inappropriate for online use without first compressing and/or changing their file type in another application. All conversions and resizing are done client-side before uploading.

Referring to FIG. 3B, for more sophisticated users who wish to maximize their file storage, the uploader applet has a second interface, which is opened by clicking on the uploader graphic toggle 302. Uploader graphic 306 is divided into different drops zones for uploading. The user has the option of anticipating the size of an image or set of images as desired. With uploader graphic 306, the uploader applet continues to convert images into non-progressive JPGs, however the user is given selections in terms of the resizing of the images. By dropping images into different designated areas on the graphic, the user can select different image sizes. The graphic uses names for each area, giant backgrounds 308, large images 316, medium images 312, and thumbnails 314; however, the sizes could be expressed in pixels or inches as well. The interface could likewise address the conversion and resizing of other file types, such as movies and audio giving the non-technical user further control over file management and uploading. In the current example, the site administrator establishes the resizing plateaus.

After uploading, the user can click on the refresh button 218 (FIG. 2A) and update my resources 114, where all the uploads will appear. The uploader empowers non-technical users to convert and resize image and possibly other files for their projects without having to learn and use other applications. The uploader makes it possible to drag images from a digital camera directly into its drop zones, have compression and necessary conversions done client-side, and bypass image preparation, a steep impediment to web authoring for the non-technical user.

Figure 6:
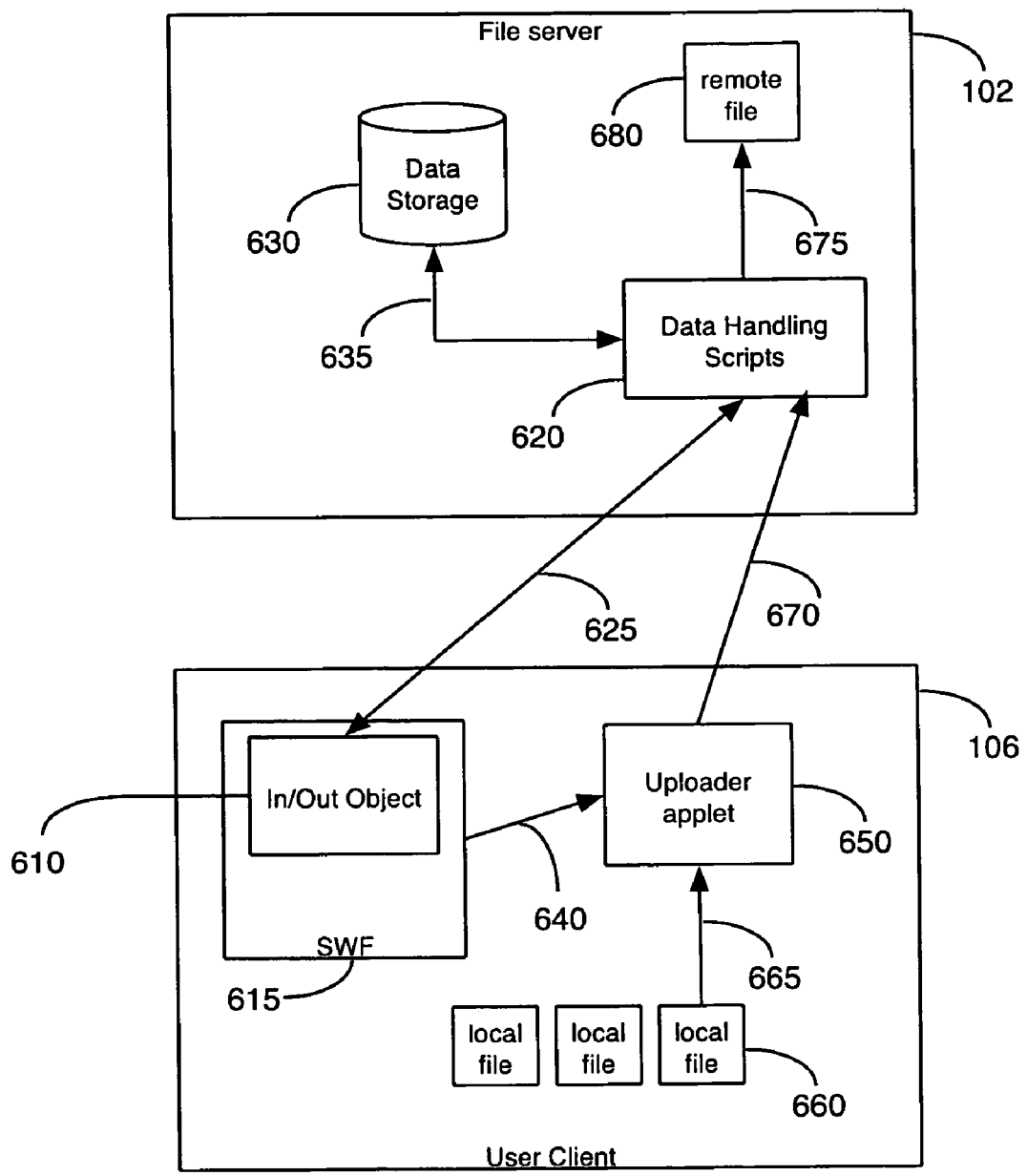
FIG. 6 illustrates the basic structural components or entities of the application in accordance with the subject disclosure.

Referring to FIG. 6, the basic structural components or entities of the application are shown. The application may be a set of software instructions stored on a server 102 or client 106 in the environment 100 of FIG. 1 as would be appreciated by those of ordinary skill in the pertinent art. In one embodiment, the process has 4 major pieces: the main application SWF 615, the uploader applet 650, the data handling layer 620, and the data storage layer 630. On a client 106 of FIG. 1, the user accesses the SWF 615 (preferably a SWF is a compiled FLASH® movie). An optional uploader applet 650 is also stored on the client 106. On the server 102, the incoming requests are handled by the data handling scripts 620, and specific user data is stored in the data storage 630, while files are stored directly on the file server 605.

The process of accessing data from within the application window 615 is handled by three basic entities: the custom-built in-out object 610, which is a component of our SWF 615; the file server's base operating system's data handling script layer 620; and the data storage layer 630. In one implementation, the data handling script 620 is PHP on Unix/Linux, and the data storage is MySQL. A function of the in-out object 610 is to be a centralized object in the main application SWF 615 where all data coming into and out of the main application SWF 615 can be handled.

The in-out object 610 is an object of which various requests can be made of other entities in the main application SWF 615, and is ready to handle such requests 705. In a preferred embodiment, the FLASH® environment has built in methods for sending and receiving 730 data from external scripts. When a user wants to add a resource file to his project or collection of resources in the application 615, the uploader 650 is launched. This is done by hitting an element or icon (not shown) on the canvas interface 101 as represented by the arrow 640. Once the uploader 650 is opened, users can drag local files 660 from the client computer 106 into the uploader 650 to initiate the upload, represented by the arrow 665. The uploader then does any optional conversions and/or checks (as in remote storage limitations), then sends the files and information to the data handling scripts 620 (a process represented by arrow 670). The data handling scripts 620 process the files and information. As a result, the files are stored as remote files 680 on the file server 102, a process represented by the arrow 675, and pertinent information is also stored about the uploaded files in the data storage layer 630, as described by arrow 635. In a preferred embodiment, the main application SWF 615 and the uploader 650 are separate entities.

Figure 7:
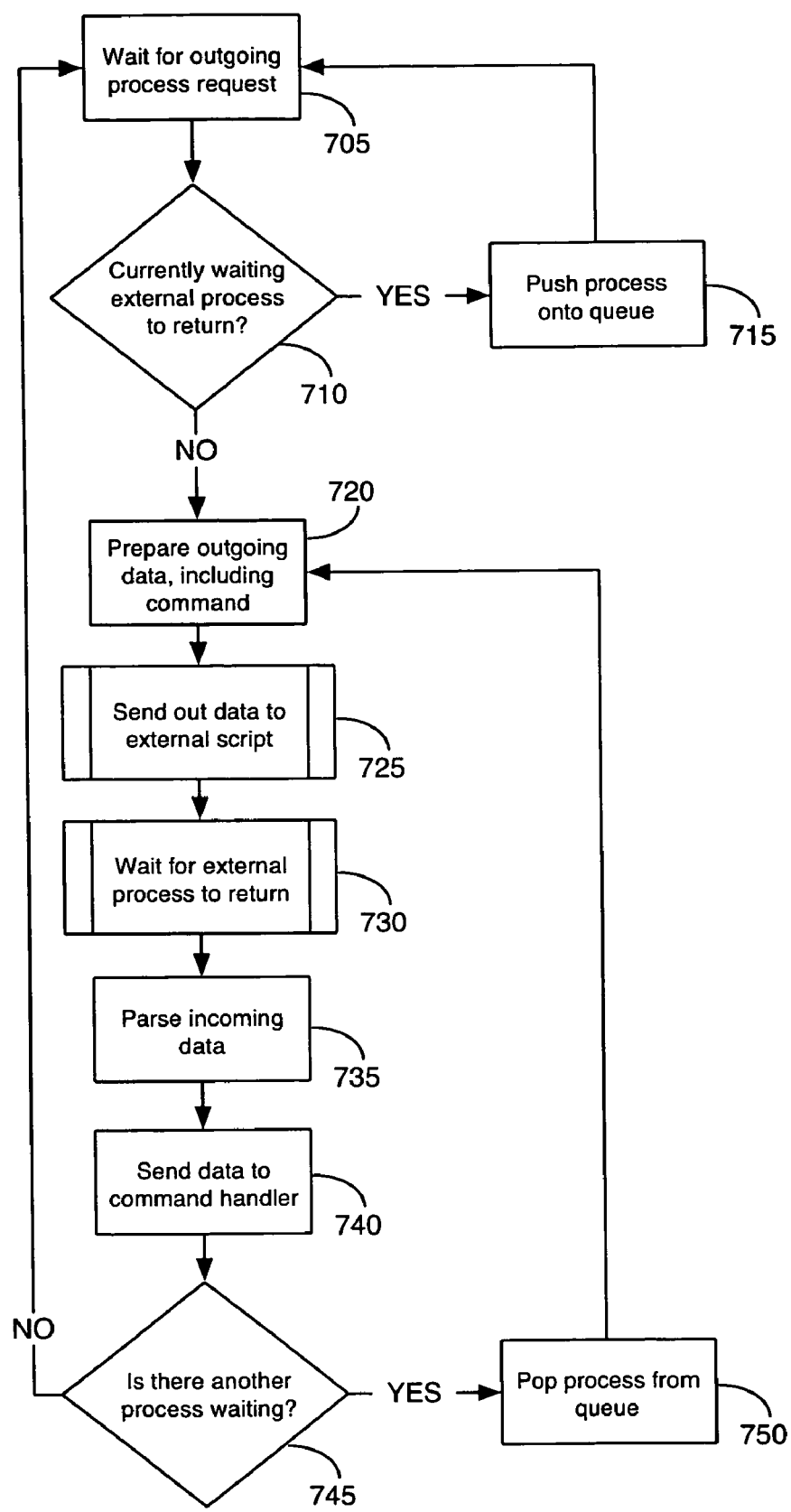
FIG. 7 illustrates a flowchart of a methodology used by the application of FIG. 6.

Referring to FIG. 7, a flowchart 700 illustrates a methodology used by the application. At step 705, the in-out object 610 is an object of which various requests can be made of other entities in the application, and is ready to handle such requests. The FLASH® environment has built into it methods for sending and receiving data from external scripts. At step 710, once a request is made of the in-out object 610, the in-out object 610 checks to see if the in-out object 610 is currently busy with another external process. This check is helpful because FLASH® may manifest problems with requests to run external scripts concurrently. If the in-out object 610 is currently busy with another external process, the process 700 proceeds to step 715 where the in-out object 610 will push the process information onto an internal queue and return to waiting for an outgoing process request (i.e., return to step 705). If there is no current external process pending, the process proceeds to step 720 where the in-out object 610 prepares and encrypts the outgoing data, including a command identifier, for exportation to the data handling script layer 620. At step 725, the in-out object 610 sends out the data.

At step 730, upon completion of the external script, the data is received. At step 735, the data is parsed and decrypted. The process 700 then sends the parsed and decrypted data to the appropriate data handler according to the command initially issued at step 740. Upon completion of the received data handling, the process 700 proceed to step 745 and the in-out object 610 (FIG. 6) checks to see if there is another process waiting in the queue. If there is, the process 700 passes to step 750 and accesses the process information from the queue, then returns to step 720 to begin the process of sending the data out as described above. At step 745, if there are no other external processes waiting to be executed, the in-out object 610 returns to waiting to handle external process requests as shown at step 705. In a preferred embodiment, the following are specific commands the in-out object 610 executes:

login
get details of a set of resources
get details of the contents of a project
get details of the contents of a project element
save a set of objects
delete a set of objects
get details of memberships/users of a group.

Figure 8:
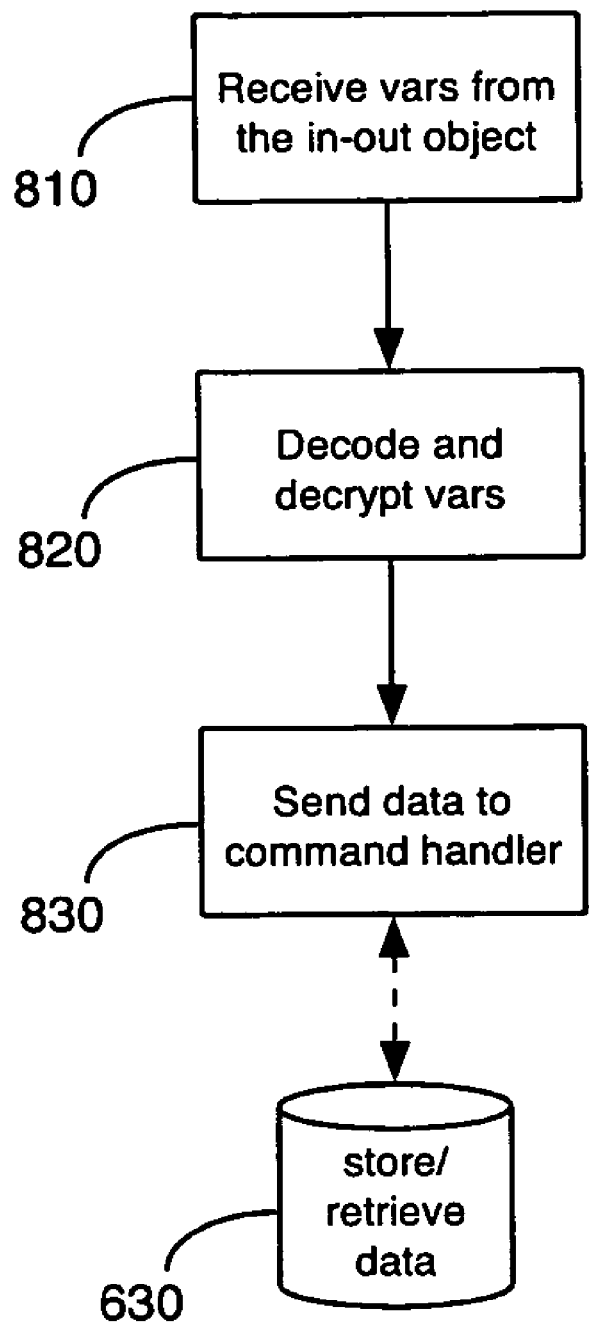
FIG. 8 illustrates a flowchart of a methodology used by an application in accordance with the subject disclosure.

Referring to FIG. 8, an overview process 800 of a process executed by the data handling layer 620 is shown. The data handling layer 620 is used to set, delete, and retrieve data from the data storage layer 630, as well as to communicate information to and from the in-out object 610. At step 810, the data handling layer 620 receives data. At step 820, the data handling layer 620 decodes the passed data. At step 830, the data handling layer 620 checks an internal switchboard to execute the appropriate subscript based on what command was passed and ultimately accesses and sets information to the data storage layer 630 as needed.

In the academic example, the central office of a school district generates curriculum for teachers. The central office administrators, the project authors, lock certain elements deemed crucial. Teachers, as the first generation of users, have a degree of flexibility in terms of changing examples, adding links to personal materials, and the like. The teachers then might lock additional elements and pass the curriculum on to students, the second generation of users, granting students the ability to answer reading questions in the material, link to their own notes of other relevant materials that they have found, and/or possibly to use a reader-based highlighting tool to mark up and annotate their readings.

In one embodiment, the application is a swf. file that travels with each of its projects as a writer and/or reader. Preferably, the output is a single xml file. The xml file contains information on how the writer should appear to the viewer in its configuration as a reader. Essentially, the writer and the reader are the same application but the creator modifies how the intended viewer experiences the writer-as-reader.

It is envisioned that the application may be offered on a website sponsored by a company, primarily to lease to individual account holders. In another embodiment, the application is hosted by an institution for institutional users to install on institutional websites, which includes institution specific administrative utility in terms of installation and account management as would be known to those of ordinary skill in the pertinent art.

While web authoring for non-technical users may be a prerequisite for many if not most virtual communities, it is envisioned that digital communities can exist in which web authoring plays little of no role. Such communities may be based on the existence of large databases of existing documents, such as an archive, and that sharing among members involves the selecting and disseminating of packets of such documents, not their creation. In such a case, the resources view 200, which manages resources, creates account holders, groups, and group membership, could alone generate and manage virtual communities. Another type of virtual community in which web authoring may not play a role and which could be managed by the resources view 200 alone involves community members creating documents, such as video or audio files, which they wish to share without connecting to web screens. Again in this example, the resources view 200 would suffice to create and manage such a digital community without the need for access to the canvas view 108.

While the invention has been described with respect to preferred embodiments, those skilled in the art will readily appreciate that various changes and/or modifications can be made to the invention without departing from the spirit or scope of the invention as defined by the appended claims.

What is claimed is:

1. A client for authoring an application for allowing users to create, control and distribute electronic content, the client communicating with a distributed computing network, the client comprising:
   (a) a memory storing an instruction set and data representing the electronic content; and
   (b) a processor for running the instruction set, the processor in communication with the memory and the distributed computing network, the processor programmed to
   (i) construct a project of the electronic content from a plurality of resource files, the project presented in a canvas view having a concurrent presentation based on a selection of the canvas view by a user, the concurrent presentation comprising a canvas area for constructing screen elements of the selected resource files to create screens; a path area for illustrating graphically a relationship among nodes of the project; and a properties area for adjusting characteristics of the selected screen elements;
   (ii) present a reader interface on a display of the client, the reader interface allowing a user to view the project, the reader interface being accessible from the canvas view; and
   (iii) present a resource interface on the display of the client, the resource interface managing groups, membership in groups, and user accounts, said groups and user accounts having varying levels of control over the project; present in the resource interface a groups and users window comprising group icons; and present a members list window for one of the groups based on a selection of one of the group icons, the members list window displaying a list comprising individual members of the selected group and the member list window providing an ability to change group-specific privileges for the individual members of the selected group, the group-specific privileges comprising an ability to share one or more of the resource files.

2. A client as recited in claim 1, wherein the processor is further programmed to present a calendar interface for supporting distribution and return of resources and projects through calendar entries and for chronological planning and group management.

3. A client as recited in claim 1, wherein the project nodes comprise one or more web screens, one or more individual resource files, one or more links to web addresses, and one or more links to email addresses.

4. A client as recited in claim 1, wherein a linking of a chosen one of the screen elements in the canvas area to a destination node in the path area by a dragging motion is represented by a linking arrow appearing in the canvas view, the linking arrow having a tail anchored in the chosen screen element in the canvas area and the linking arrow having a head moving to a position of the destination node in the path area, the linking arrow disappearing based on a selection of the destination node by a drop of the linking arrow head on the destination node.

5. A client as recited in claim 1, wherein the path area provides linking to a foreign file comprising a word processing file, a spreadsheet file, or a database file.

6. A client as recited in claim 1, further comprising a visibility tool modifying an opacity of an image, allowing one or more of the screen elements that are behind the image to show through to a desired degree.

* * * * *